(12) United States Patent
Ito

(10) Patent No.: US 9,101,832 B2
(45) Date of Patent: Aug. 11, 2015

(54) STORAGE MEDIUM HAVING STORED THEREON IMAGE PROCESSING PROGRAM, IMAGE PROCESSING APPARATUS, IMAGE PROCESSING SYSTEM, AND IMAGE PROCESSING METHOD

(75) Inventor: Yuichiro Ito, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 831 days.

(21) Appl. No.: 12/980,620

(22) Filed: Dec. 29, 2010

(65) Prior Publication Data

US 2011/0304607 A1  Dec. 15, 2011

(30) Foreign Application Priority Data

Jun. 9, 2010  (JP) ................. 2010-132399

(51) Int. Cl.
| | |
|---|---|
| G09G 5/00 | (2006.01) |
| A63F 13/40 | (2014.01) |
| A63F 13/30 | (2014.01) |
| G06T 7/20 | (2006.01) |
| G06T 11/60 | (2006.01) |

(52) U.S. Cl.
CPC ............. *A63F 13/10* (2013.01); *A63F 13/12* (2013.01); *G06T 7/2046* (2013.01); *G06T 11/60* (2013.01); *A63F 2300/1075* (2013.01); *A63F 2300/1093* (2013.01); *A63F 2300/204* (2013.01); *A63F 2300/6018* (2013.01); *A63F 2300/695* (2013.01); *A63F 2300/8094* (2013.01); *G06T 2207/30201* (2013.01)

(58) Field of Classification Search
CPC ....... G06T 19/00; G06T 11/60; G06T 19/006; G06K 9/4671; A61B 1/00045; A61B 1/0005
USPC ........................................... 345/629
See application file for complete search history.

(56) References Cited

U.S. PATENT DOCUMENTS 5,940,538 A  8/1999 Spiegel et al.
(Continued)

FOREIGN PATENT DOCUMENTS

| EP | 0 999 518 | 5/2000 |
|---|---|---|
| EP | 1 710 746 | 10/2006 |
| EP | 1 713 030 | 10/2006 |
| EP | 1 950 700 | 7/2008 |

(Continued)

OTHER PUBLICATIONS

Office Action dated Apr. 7, 2014 issued in connection with European Patent Appln. No. 10 197 331.1.

*Primary Examiner* — Charles Tseng
(74) *Attorney, Agent, or Firm* — Nixon & Vanderhye, P.C.

(57) ABSTRACT

Data of a coordinate input provided on a second image displayed on a display device is acquired, and input position data representing the coordinate input provided on the second image is generated. At least a first feature point is extracted from a first image, the first feature point being a feature point having a first feature on the first image; a predetermined superimposition image is superimposed on the first image, at a position on the first image based on the first feature point, the position corresponding to a position, represented by the input position data, on the second image based on a second feature point, the second feature point being a feature point having the first feature on the second image; and the first image on which the superimposition has been made is displayed on the display device.

28 Claims, 17 Drawing Sheets

(56) References Cited

U.S. PATENT DOCUMENTS

| | | | |
|---|---|---|---|
| 8,139,087 B2* | 3/2012 | Kuroki et al. | 345/633 |
| 2008/0084482 A1* | 4/2008 | Hansson et al. | 348/218.1 |
| 2008/0175509 A1* | 7/2008 | Wheeler et al. | 382/260 |
| 2009/0315913 A1* | 12/2009 | Nagashima et al. | 345/629 |
| 2010/0115439 A1* | 5/2010 | Engel et al. | 715/764 |

FOREIGN PATENT DOCUMENTS

| | | |
|---|---|---|
| EP | 1 975 870 | 10/2008 |
| JP | 2000-069404 | 3/2000 |
| JP | 2004-94917 | 3/2004 |
| JP | 2005-216131 | 8/2005 |
| JP | 2010-017360 | 1/2010 |

* cited by examiner

F I G. 17A
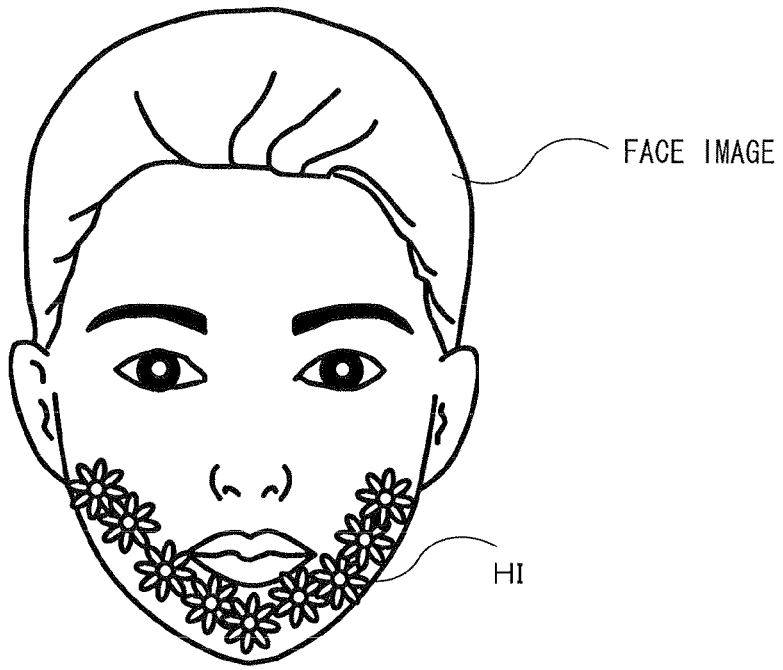
F I G. 17B

STORAGE MEDIUM HAVING STORED THEREON IMAGE PROCESSING PROGRAM, IMAGE PROCESSING APPARATUS, IMAGE PROCESSING SYSTEM, AND IMAGE PROCESSING METHOD

CROSS REFERENCE TO RELATED APPLICATION

The disclosure of Japanese Patent Application No. 2010-132399, filed Jun. 9, 2010, is incorporated herein by reference.

FIELD

The present invention relates to a storage medium having stored thereon an image processing program, an image processing apparatus, an image processing system, and an image processing method, and in particular, relates to a storage medium having stored thereon an image processing program, an image processing apparatus, an image processing system, and an image processing method that superimpose an image corresponding to a user input on another image.

BACKGROUND AND SUMMARY

Conventionally, as disclosed, for example, in Japanese Laid-Open Patent Publication No. 2000-69404 (hereinafter referred to as "Patent Literature 1"), various proposals are made for devices that provide an image displayed on a display device with decorations of a user's preference. An image print creation device disclosed in Patent Literature 1 enables a user to put makeup on a captured image. Specifically, in the image print creation device, a makeup palette is prepared that includes various makeup tools (for example, lipsticks of different colors and foundation). The user can put makeup on a captured image displayed on a monitor by operating a stylus on the monitor, using a given makeup tool included in the makeup palette.

In the image print creation device disclosed in Patent Literature 1, however, image processing is performed such that the user directly puts makeup on a still image of the user captured by the device. Accordingly, the user can put makeup on the still image by an operation where the user themselves touches the still image, and therefore can enjoy viewing the made-up still image. The image that can be enjoyed by the user, however, is only the made-up still image, which is temporary.

Thus, it is an object of the present invention to provide a storage medium having stored thereon an image processing program, an image processing apparatus, an image processing system, and an image processing method that can reflect an image corresponding to a user input on an image different from an image used for the user input.

To achieve the above object, the present invention may have the following features, for example.

A configuration example of a computer-readable storage medium having stored thereon an image processing program according to the present invention is executed by a computer of an image processing apparatus that displays an image on a display device. The image processing program causes the computer to function as first image acquisition means, first feature point extraction means, second image display control means, coordinate input acquisition means, input position data generation means, first image superimposition means, and first image display control means. The first image acquisition means acquires a first image. The first feature point extraction means extracts at least a first feature point from the first image, the first feature point being a feature point having a first feature on the first image. The second image display control means displays a second image on the display device. The coordinate input acquisition means acquires data of a coordinate input provided on the second image displayed on the display device. The input position data generation means generates input position data representing a position of the coordinate input provided on the second image, using the data acquired by the coordinate input acquisition means. The first image superimposition means superimposes a predetermined superimposition image on the first image, at a position on the first image based on the first feature point, the position corresponding to a position, represented by the input position data, on the second image based on a second feature point, the second feature point being a feature point having the first feature on the second image. The first image display control means displays on the display device the first image on which the superimposition has been made by the first image superimposition means. It should be noted that the first image and the second image displayed on the display device may be temporarily the same, or may be invariably different from each other.

Based on the above, it is possible to reflect an image corresponding to a user input on an image different from an image used for the user input.

Further, the image processing program may further cause the computer to function as second image superimposition means. The second image superimposition means, based on the input position data, superimposes on the second image an input image representing the coordinate input. In this case, the second image display control means may display on the display device the second image on which the superimposition has been made by the second image superimposition means. The first image superimposition means may superimpose the superimposition image on the first image, at a position on the first image based on the first feature point, the position corresponding to a position of the input image on the second image based on the second feature point.

Based on the above, it is possible to reflect an image corresponding to a user input on an image used for the user input and also on an image different from the image used for the user input.

Further, the first image superimposition means may superimpose the superimposition image on the first image, at the position on the first image based on the first feature point, the position corresponding to the position of the input image on the second image based on the second feature point, the superimposition image being an image based on the input image.

Based on the above, the image based on the input image input on the second image is also superimposed on the first image. Thus, it is possible to achieve an operation feeling as if the user has input the image on the first image.

Further, the image processing program may further cause the computer to function as second image acquisition means and second feature point extraction means. The second image acquisition means acquires the second image. The second feature point extraction means extracts the second feature point having the first feature from the second image acquired by the second image acquisition means.

Based on the above, it is possible to use the newly acquired second image as an image to be used to provide a coordinate input by the user.

Further, the first image acquisition means may acquire a moving image as the first image. The first feature point extraction means may extract the first feature point from a frame image included in the moving image acquired by the first image acquisition means. The first image superimposition means may superimpose the superimposition image on the frame image included in the moving image, at a position on the frame image based on the first feature point, the position corresponding to the position, represented by the input position data, on the second image based on the second feature point. It should be noted that the first image superimposition means may superimpose the superimposition image on the frame image from which the extraction has been made by the first feature point extraction means, or may superimpose the superimposition image on the subsequent frame image (a frame image different from the frame image from which the extraction has been made). In the first case, the first image superimposition means superimposes the superimposition image on the frame image, at a position on the frame image based on the position of the first feature point on the frame image from which the extraction has been made. In the second case, the first image superimposition means superimposes the superimposition image on the frame image, at a position on the frame image based on the same position on the frame image on which the superimposition is to be made.

Based on the above, it is possible to reflect an image corresponding to a user input on a moving image different from an image used for the user input.

Further, the second image display control means may display a still image as the second image on the display device. The coordinate input acquisition means may acquire data of a coordinate input provided on the still image displayed on the display device. The input position data generation means may generate input position data representing a position of the coordinate input provided on the still image, using the data acquired by the coordinate input acquisition means.

Based on the above, it is possible to use a still image as an image to be used to provide a coordinate input by the user. This makes it easy for the user to provide an input on a desired position on the second image.

Further, the first feature point extraction means may extract the first feature point from each of a plurality of frame images included in the moving image acquired by the first image acquisition means. The first image superimposition means may superimpose the superimposition image on said each of the plurality of frame images included in the moving image, at a position on said each of the plurality of frame images based on the first feature point, the position corresponding to the position, represented by the input position data, on the second image based on the second feature point.

Based on the above, it is possible to reflect an image corresponding to a user input on not only one image but also each of the frame images included in a moving image.

Further, the input position data generation means may include input position data updating means. The input position data updating means sequentially updates the input position data every time the coordinate input acquisition means acquires the coordinate input. The first image superimposition means may superimpose the superimposition image on the corresponding frame image, at a position on the corresponding frame image based on the first feature point, the position corresponding to a position represented by the input position data most recently updated by the input position data updating means.

Based on the above, it is possible to reflect an image corresponding to the most recent user input on an image different from an image used for a user input.

Further, the image processing program may further cause the computer to function as frame image storage control means. The frame image storage control means temporarily stores in a storage device the frame image included in the moving image acquired by the first image acquisition means. When the first feature point extraction means has extracted the first feature point from the frame image acquired by the first image acquisition means, the first image superimposition means may read from the storage device the frame image from which the extraction has been made, and may superimpose the superimposition image on the frame image, at the position on the frame image based on the first feature point.

Based on the above, even when it takes a long time to perform a process of extracting the first feature point from the first image, it is possible to reflect an image corresponding to a user input on the first image.

Further, the first feature point extraction means may extract at least the first feature point and a third feature point from the first image, the third feature point being a feature point having a second feature on the first image. The first image superimposition means may superimpose the superimposition image on the first image, at a position on the first image based on the first feature point and the third feature point, the position corresponding to a position, represented by the input position data, on the second image based on the second feature point and a fourth feature point, the fourth feature point being a feature point having the second feature on the second image.

Based on the above, the use of the plurality of feature points makes it possible to determine that a position on the first image corresponding to the position at which a coordinate input has been provided on the second image is a specific position, and to display the superimposition image at a position corresponding to the position at which the coordinate input has been provided by the user.

Further, in accordance with a relationship between: a distance between the second feature point and the fourth feature point on the second image; and a distance between the first feature point and the third feature point on the first image, the first image superimposition means may set a size of the superimposition image corresponding to the position represented by the input position data, and may superimpose the superimposition image on the first image.

Based on the above, when, for example, the display size of a predetermined object included in the second image is relatively different from the display size of the object included in the first image, it is possible to display the superimposition image in a size corresponding to the difference in display size.

Further, the first image superimposition means may determine a position and an orientation of the superimposition image to be superimposed on the first image, such that a relative positional relationship between: the first feature point and the third feature point on the first image; and the superimposition image, is the same as a relative positional relationship between: the second feature point and the fourth feature point on the second image; and the position represented by the input position data.

Based on the above, when, for example, the display orientation of a predetermined object included in the second image is relatively different from the display orientation of the object included in the first image, it is possible to superimpose the superimposition image in an orientation on which the difference in display orientation is reflected, and to display the superimposed result.

Further, the first image superimposition means may include image extraction means and extracted-image superimposition means. The image extraction means extracts from the second image the input image included in a region determined based on the second feature point. The extracted-image superimposition means superimposes the superimposition image on the first image based on the first feature point, the superimposition image being the input image extracted by the image extraction means.

Based on the above, it is possible to easily generate the superimposition image by copying the input image.

Further, the image extraction means may extract from the second image the input image included in a region surrounded by three or more feature points, each having a unique feature on the second image. The first feature point extraction means may extract three or more feature points from the first image, the three or more feature points having the unique features and corresponding to the three or more feature points on the second image. The extracted-image superimposition means may superimpose the input image extracted by the image extraction means on the first image, in a region surrounded by the three or more feature points extracted by the first feature point extraction means.

Based on the above, it is possible to generate the superimposition image by copying the input image included in a region to a region in the first image corresponding to the region.

Further, the first image superimposition means may include texture generation means. The texture generation means generates a texture representing the input image superimposed on the second image. In this case, the first image superimposition means may set texture coordinates of a predetermined polygon corresponding to the texture based on the second feature point on the second image, may map the texture on the polygon, may place the polygon on the first image based on the first feature point on the first image, and may superimpose the superimposition image on the first image.

Based on the above, it is possible to generate the superimposition image by mapping the texture of the input image on a polygon.

Further, the first image and the second image may each be an image including a face image representing a person's face. The first feature point extraction means may extract the first feature point from the face image of a person's face recognized in a face recognition process performed on the first image acquired by the first image acquisition means, the first feature point being a point having the first feature in accordance with the face image. The first image superimposition means may superimpose the superimposition image on the first image such that the second feature point is a point having the first feature in accordance with the face image included in the second image.

Further, the first image and the second image may each be an image including a face image representing a person's face. The second feature point extraction means may extract the second feature point from the face image of a person's face recognized in a face recognition process performed on the second image acquired by the second image acquisition means, the second feature point being a point having the first feature in accordance with the face image. The first feature point extraction means may extract the first feature point from the face image of a person's face recognized in a face recognition process performed on the first image acquired by the first image acquisition means, the first feature point being a point having the first feature in accordance with the face image.

Based on the above, it is possible to superimpose the superimposition image corresponding to a user input on the face image of a person's face recognized in an image, and to display the first image.

Further, the first image acquisition means may acquire, as the first image, a moving image of a real world captured in real time by a real camera available to the image processing apparatus.

Based on the above, it is possible to superimpose the superimposition image corresponding to a user input on a moving image of the real world captured in real time by a real camera, and to display the superimposed result.

Further, the image processing program may further cause the computer to function as second image acquisition means and second feature point extraction means. The second image acquisition means acquires the second image. The second feature point extraction means: extracts a plurality of feature points from an image representing an object recognized in a process of recognizing a predetermined object performed on the second image acquired by the second image acquisition means, each feature point having a unique feature on the image representing the object; and further extracts a plurality of out-of-region points provided outside the image representing the object, in a radial manner from the corresponding feature points. In this case, the first feature point extraction means may extract a plurality of feature points from an image representing an object recognized in a process of recognizing the predetermined object performed on the first image acquired by the first image acquisition means, the plurality of feature points having the unique features and corresponding to the plurality of feature points extracted by the second feature point extraction means, and may further extract a plurality of out-of-region points provided outside the image representing the object, in a radial manner, so as to correspond to the plurality of out-of-region points extracted by the second feature point extraction means. Furthermore, the first image superimposition means may include image extraction means and extracted-image superimposition means. The image extraction means extracts from the second image the input image included in a region surrounded by three or more of the feature points and/or the out-of-region points set by the second feature point extraction means. The extracted-image superimposition means superimposes the superimposition image on the first image, in a region surrounded by three or more of the feature points and/or the out-of-region points corresponding to the region from which the input image has been extracted, the superimposition image being the input image extracted by the image extraction means.

Based on the above, when a predetermined object is recognized in the first image and the second image, and the superimposition image corresponding to a user input is superimposed on the object and the superimposed result is displayed, it is possible to generate the superimposition image even on the user input provided outside the region of the object, and to display the superimposed result.

Further, the display device may include at least a first display screen and a second display screen. In this case, the second image display control means may display the second image on the second display screen. The first image display control means may display on the first display screen the first image on which the superimposition has been made by the first image superimposition means.

Based on the above, it is possible to simultaneously display the first image and the second image on the first display screen and the second display screen, respectively.

Further, the display device may include a touch panel that covers the second display screen. In this case, the coordinate input acquisition means may acquire, as the data of the coordinate input, data representing a touch position of a touch performed on the touch panel. The input position data generation means may generate, as the input position data, data representing a position on the second image that overlaps the touch position.

Based on the above, it is possible to superimpose the superimposition image corresponding to a touch input on the first image, and to display the superimposed result.

Further, the first display screen may be capable of displaying a stereoscopically visible image, using a left-eye image and a right-eye image. In this case, the first image acquisition means may acquire, as the first image, a stereoscopically visible image including a left-eye image and a right-eye image. The first feature point extraction means may extract the first feature point from each of the left-eye image and the right-eye image of the first image. The first image superimposition means may superimpose the superimposition image on the first image, at a position of the left-eye image and a position of the right-eye image on the first image based on the first feature point, each position corresponding to the position, represented by the input position data, on the second image based on the second feature point. The first image display control means may display the stereoscopically visible image on the first display screen, using the left-eye image and the right-eye image of the first image on which the superimposition has been made by the first image superimposition means.

Based on the above, it is possible to superimpose the superimposition image corresponding to a user input on a stereoscopically visible image, and to display the superimposed result.

Further, the present invention may be carried out in the form of an image processing apparatus and an image processing system that include the above means, and may be carried out in the form of an image processing method including steps performed by the above means.

Further, in the image processing system, at least a first apparatus and a second apparatus may be configured to communicate with each other. In this case, the first apparatus may include the second image display control means, the coordinate input acquisition means, the input position data generation means, second image superimposition means, and data transmission means. The second image superimposition means, based on the input position data, superimposes on the second image an input image representing the coordinate input. The data transmission means transmits data of the input image to the second apparatus. In this case, the second image display control means may display, on a display device available to the first apparatus, the second image on which the superimposition has been made by the second image superimposition means. Furthermore, the second apparatus may include data reception means, the first image acquisition means, the first feature point extraction means, the first image superimposition means, and the first image display control means. The data reception means receives the data of the input image from the first apparatus. In this case, based on the data of the input image received by the data reception means, the first image superimposition means may superimpose the superimposition image on the first image, at the position on the first image based on the first feature point, the position corresponding to a position of the input image on the second image based on the second feature point, the superimposition image being an image based on the input image. The first image display control means may display, on a display device available to the second apparatus, the first image on which the superimposition has been made by the first image superimposition means.

Based on the above, the transmission and reception of the data of the input image make it possible to superimpose on the first image the superimposition image corresponding to an input provided by another user, and to display the superimposed result.

Based on the present invention, it is possible to reflect an image corresponding to a user input on an image different from an image used for the user input.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17A is a diagram showing an example where the hand-drawn image HI is generated such that predetermined marks are arranged along the position corresponding to a touch input; and FIG. 17B is a diagram showing an example where the hand-drawn image HI is generated such that the predetermined marks are arranged along the position corresponding to the touch input.

DESCRIPTION OF THE PREFERRED EMBODIMENTS

Figure 1:
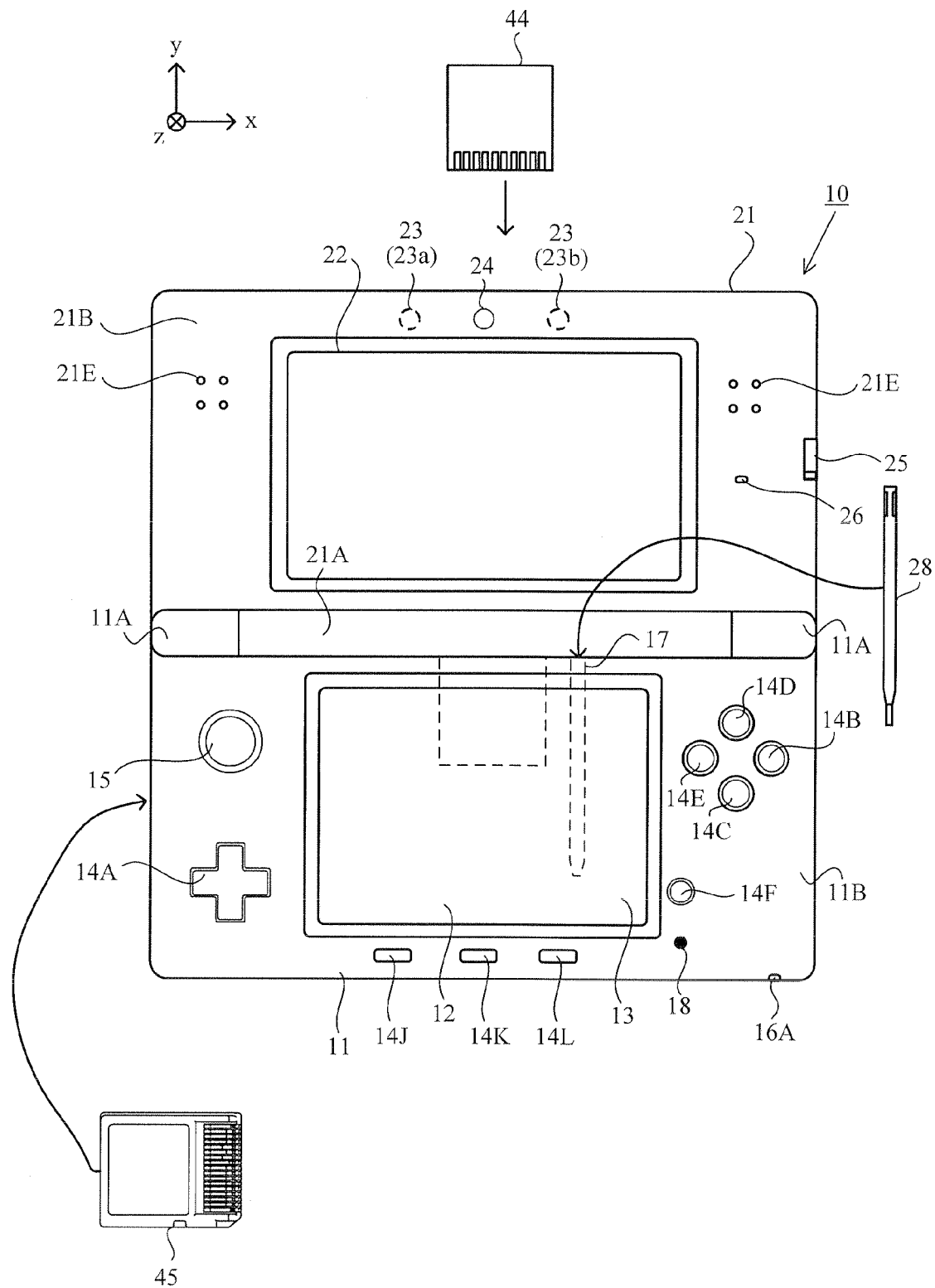
FIG. 1 is a front view showing an example of a game apparatus 10 being open.
Figure 2:
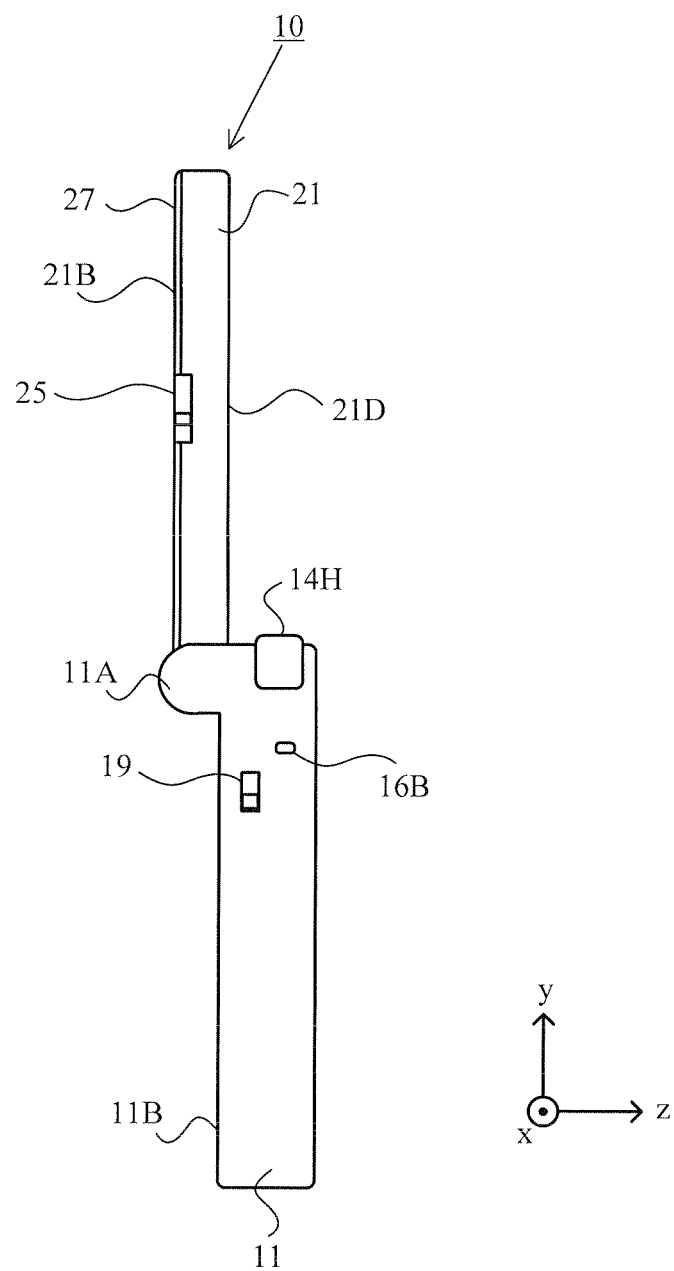
FIG. 2 is a right side view showing an example of the game apparatus 10 being open.
Figure 3:
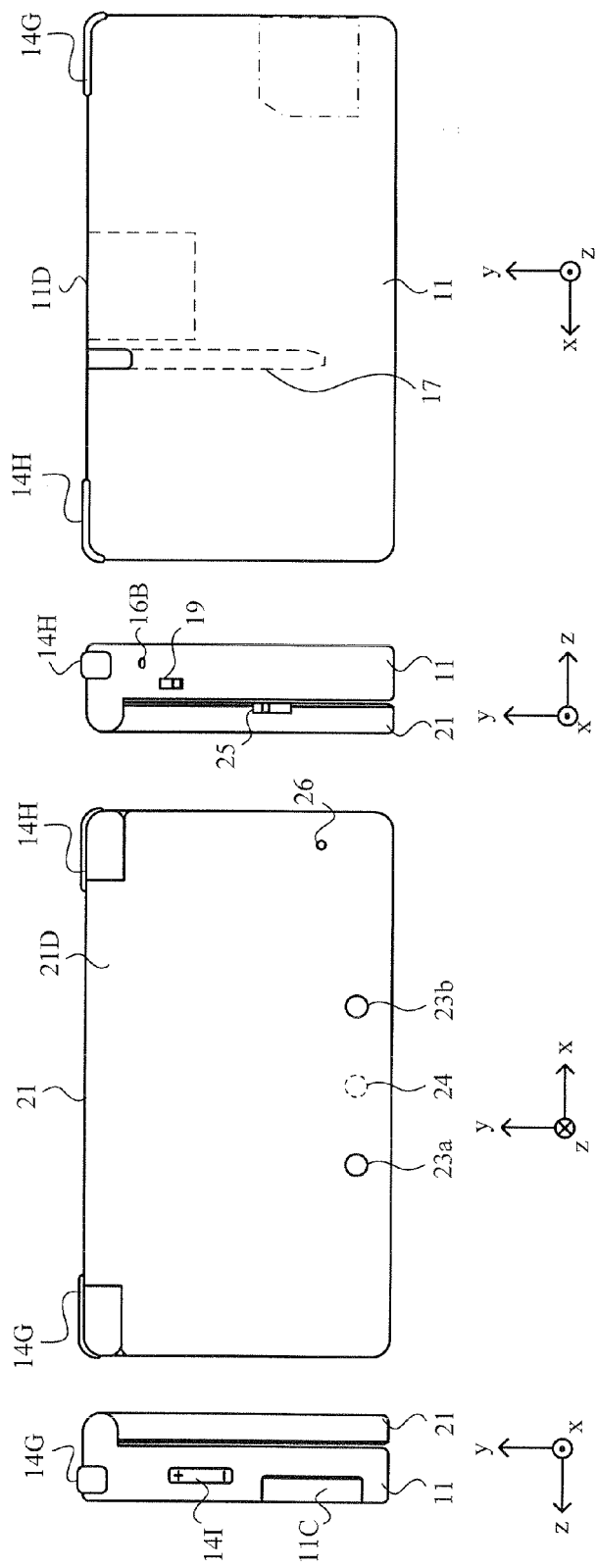
FIG. 3A is a left side view showing an example of the game apparatus 10 being closed.
FIG. 3B is a front view showing an example of the game apparatus 10 being closed.
FIG. 3C is a right side view showing an example of the game apparatus 10 being closed.
FIG. 3D is a rear view showing an example of the game apparatus 10 being closed.

With reference to the drawings, a description is given of an image processing apparatus that executes an image processing program according to an embodiment of the present invention. The image processing program according to the present invention can be applied by being executed by any computer system. As an example of the image processing apparatus, a hand-held game apparatus 10 is taken, and the description is given using the image processing program executed by the game apparatus 10. It should be noted that FIGS. 1 through 3D are each a plan view showing an example of the outer appearance of the game apparatus 10. As an example, the game apparatus 10 is a hand-held game apparatus, and is configured to be foldable as shown in FIGS. 1 through 3D. FIG. 1 is a front view showing an example of the game apparatus 10 being open (in an open state). FIG. 2 is a right side view showing an example of the game apparatus 10 in the open state. FIG. 3A is a left side view showing an example of the game apparatus 10 being closed (in a closed state). FIG. 3B is a front view showing an example of the game apparatus 10 in the closed state. FIG. 3C is a right side view showing an example of the game apparatus 10 in the closed state. FIG. 3D is a rear view showing an example of the game apparatus 10 in the closed state. The game apparatus 10 includes imaging sections, and is capable, for example, of capturing an image with the imaging sections, displaying the captured image on a screen, and storing data of the captured image. The game apparatus 10 is capable of executing a game program stored in an exchangeable memory card, or received from a server or another game apparatus, and is also capable of displaying on the screen an image generated by computer graphics processing, such as an image captured by a virtual camera set in a virtual space.

Referring to FIGS. 1 through 3D, the game apparatus 10 includes a lower housing 11 and an upper housing 21. The lower housing 11 and the upper housing 21 are joined to each other so as to be openable and closable in a folding manner (foldable). In the example of FIG. 1, the lower housing 11 and the upper housing 21 each has a wider-than-high rectangular plate-like shape, and are joined to each other at one of the long sides of the lower housing 11 and the corresponding one of the long sides of the upper housing 21 so as to be pivotable relative to each other. Normally, a user uses the game apparatus 10 in the open state. The user stores away the game apparatus 10 in the closed state when not using it. Further, as well as the closed state and the open state that are described above, the game apparatus 10 can maintain the lower housing 11 and the upper housing 21 at any angle formed between the game apparatus 10 in the closed state and the game apparatus 10 in the open state due, for example, to a frictional force generated at the connecting part. That is, the upper housing 21 can be maintained stationary at any angle with respect to the lower housing 11.

As shown in FIGS. 1 and 2, projections 11A are provided at the upper long side portion of the lower housing 11, each projection 11A projecting perpendicularly to an inner surface (main surface) 11B of the lower housing 11. A projection 21A is provided at the lower long side portion of the upper housing 21, the projection 21A projecting perpendicularly to the lower side surface of the upper housing 21 from the lower side surface of the upper housing 21. The joining of the projections 11A of the lower housing 11 and the projection 21A of the upper housing 21 connects the lower housing 11 and the upper housing 21 in a foldable manner.

The lower housing 11 includes a lower liquid crystal display (LCD) 12, a touch panel 13, operation buttons 14A through 14L (FIG. 1, FIGS. 3A through 3D), an analog stick 15, LEDs 16A and 16B, an insertion slot 17, and a microphone hole 18. These components are described in detail below.

As shown in FIG. 1, the lower LCD 12 is accommodated in the lower housing 11. The lower LCD 12 has a wider-than-high shape, and is placed such that the long side direction of the lower LCD 12 coincides with the long side direction of the lower housing 11. The lower LCD 12 is placed at the center of the lower housing 11. The lower LCD 12 is provided on the inner surface (main surface) of the lower housing 11, and the screen of the lower LCD 12 is exposed through an opening of the inner surface of the lower housing 11. The game apparatus 10 is in the closed state when not used, so that the screen of the lower LCD 12 is prevented from being soiled or damaged. As an example, the number of pixels of the lower LCD 12 is 256 dots×192 dots (horizontal×vertical). Unlike the upper LCD 22 described later, the lower LCD 12 is a display device that displays an image in a planar manner (not in a stereoscopically visible manner). It should be noted that although an LCD is used as a display device in the present embodiment, any other display device may be used, such as a display device using electroluminescence (EL). Further, a display device having any resolution may be used as the lower LCD 12.

As shown in FIG. 1, the game apparatus 10 includes the touch panel 13 as an input device. The touch panel 13 is mounted so as to cover the screen of the lower LCD 12. In the present embodiment, the touch panel 13 may be, but is not limited to, a resistive touch panel. The touch panel may also be a touch panel of any pressure type, such as an electrostatic capacitance type. In the present embodiment, the touch panel 13 has the same resolution (detection accuracy) as that of the lower LCD 12. The resolutions of the touch panel 13 and the lower LCD 12, however, may not necessarily need to be the same. Further, the insertion slot 17 (a dashed line shown in FIGS. 1 and 3D) is provided on the upper side surface of the lower housing 11. The insertion slot 17 can accommodate a stylus 28 that is used to perform an operation on the touch panel 13. Although an input to the touch panel 13 is normally provided using the stylus 28, an input may be provided on the touch panel 13 not only by the stylus 28 but also by a finger of the user.

The operation buttons 14A through 14L are each an input device for providing a predetermined input. As shown in FIG. 1, among the operation buttons 14A through 14L, the cross button 14A (direction input button 14A), the button 14B, the button 14C, the button 14D, the button 14E, the power button 14F, the select button 14J, the home button 14K, and the start button 14L are provided on the inner surface (main surface) of the lower housing 11. The cross button 14A is cross-shaped, and includes buttons for indicating up, down, left, and right directions, respectively. The button 14B, the button 14C, the button 14D, and the button 14E are arranged in a cross formation. The buttons 14A through 14E, the select button 14J, the home button 14K, and the start button 14L are appropriately assigned functions, respectively, in accordance with the program executed by the game apparatus 10. The cross button 14A is used for, for example, a selection operation. The operation buttons 14B through 14E are used for, for example, a determination operation or a cancellation operation. The power button 14F is used to power on/off the game apparatus 10.

The analog stick 15 is a device for indicating a direction, and is provided to the upper left of the lower LCD 12 of the inner surface of the lower housing 11. As shown in FIG. 1, the cross button 14A is provided to the lower left of the lower LCD 12 of the lower housing 11 such that the analog stick 15 is provided above the cross button 14A. The analog stick 15 and the cross button 14A are placed so as to be operated by the thumb of a left hand holding the lower housing 11. Further, the provision of the analog stick 15 in the upper area places the analog stick 15 at the position where the thumb of a left hand holding the lower housing 11 is naturally placed, and also places the cross button 14A at the position where the thumb of the left hand is moved slightly downward from the analog stick 15. The key top of the analog stick 15 is configured to slide parallel to the inner surface of the lower housing 11. The analog stick 15 functions in accordance with the program executed by the game apparatus 10. When, for example, the game apparatus 10 executes a game where a predetermined object appears in a three-dimensional virtual space, the analog stick 15 functions as an input device for moving the predetermined object in the three-dimensional virtual space. In this case, the predetermined object is moved in the direction in which the key top of the analog stick 15 has slid. It should be noted that the analog stick 15 may be a component capable of providing an analog input by being tilted by a predetermined amount in any one of up, down, right, left, and diagonal directions.

The four buttons arranged in a cross formation, that is, the button 14B, the button 14C, the button 14D, and the button 14E, are placed where the thumb of a right hand holding the lower housing 11 is naturally placed. Further, these four buttons and the analog stick 15 are placed symmetrically to each other with respect to the lower LCD 12. This also enables, for example, a left-handed person to provide a direction indication input using these four buttons, depending on the game program.

Further, the microphone hole 18 is provided on the inner surface of the lower housing 11. Underneath the microphone hole 18, a microphone (see FIG. 6) is provided as the sound input device described later, and detects a sound from outside the game apparatus 10.

As shown in FIGS. 3B and 3D, the L button 14G and the R button 14H are provided on the upper side surface of the lower housing 11. The L button 14G is provided at the left end portion of the upper side surface of the lower housing 11, and the R button 14H is provided at the right end portion of the upper side surface of the lower housing 11. As described later, the L button 14G and the R button 14H function as shutter buttons (capturing instruction buttons) of the imaging sections. Further, as shown in FIG. 3A, the sound volume button 14I is provided on the left side surface of the lower housing 11. The sound volume button 14I is used to adjust the sound volume of a speaker of the game apparatus 10.

As shown in FIG. 3A, a cover section 11C is provided on the left side surface of the lower housing 11 so as to be openable and closable. Inside the cover section 11C, a connector (not shown) is provided for electrically connecting the game apparatus 10 and a data storage external memory 45. The data storage external memory 45 is detachably attached to the connector. The data storage external memory 45 is used to, for example, record (store) data of an image captured by the game apparatus 10. It should be noted that the connector and the cover section 11C may be provided on the right side surface of the lower housing 11.

As shown in FIG. 3D, on the upper side surface of the lower housing 11, an insertion slot 11D is provided, into which an external memory 44 having a game program stored thereon is to be inserted. Inside the insertion slot 11D, a connector (not shown) is provided for electrically connecting the game apparatus 10 and the external memory 44 in a detachable manner. A predetermined game program is executed by connecting the external memory 44 to the game apparatus 10. It should be noted that the connector and the insertion slot 11D may be provided on another side surface (the right side surface, for example) of the lower housing 11.

As shown in FIG. 1, on the lower side surface of the lower housing 11, the first LED 16A is provided for notifying the user of the on/off state of the power supply of the game apparatus 10. Further, as shown in FIG. 3C, on the right side surface of the lower housing 11, the second LED 16B is provided for notifying the user of the establishment state of the wireless communication of the game apparatus 10. Furthermore, the game apparatus 10 is capable of wirelessly communicating with other devices, and the second LED 16B is lit on when wireless communication is established between the second LED 16B and other devices. The game apparatus 10 has the function of establishing connection with a wireless LAN by, for example, a method based on the IEEE 802.11.b/g standard. On the right side surface of the lower housing 11, a wireless switch 19 is provided for enabling/disabling the function of the wireless communication (see FIG. 3C).

It should be noted that although not shown in the figures, a rechargeable battery that serves as the power supply of the game apparatus 10 is accommodated in the lower housing 11, and the battery can be charged through a terminal provided on the side surface (the upper side surface, for example) of the lower housing 11.

The upper housing 21 includes an upper LCD 22, an outer imaging section 23 having two outer imaging sections (a left outer imaging section 23a and a right outer imaging section 23b), an inner imaging section 24, a 3D adjustment switch 25, and a 3D indicator 26. These components are described in detail below.

As shown in FIG. 1, the upper LCD 22 is accommodated in the upper housing 21. The upper LCD 22 has a wider-than-high shape, and is placed such that the long side direction of the upper LCD 22 coincides with the long side direction of the upper housing 21. The upper LCD 22 is placed at the center of the upper housing 21. As an example, the area of the screen of the upper LCD 22 is set greater than that of the lower LCD 12. Specifically, the screen of the upper LCD 22 is set horizontally longer than the screen of the lower LCD 12. That is, the proportion of the width in the aspect ratio of the screen of the upper LCD 22 is set greater than that of the lower LCD 12.

The screen of the upper LCD 22 is provided on the inner surface (main surface) 21B of the upper housing 21, and is exposed through an opening of the inner surface of the upper housing 21. Further, as shown in FIG. 2, the inner surface of the upper housing 21 is covered by a transparent screen cover 27. The screen cover 27 protects the screen of the upper LCD 22, and integrates the upper LCD 22 and the inner surface of the upper housing 21, and thereby provides unity. As an example, the number of pixels of the upper LCD 22 is 640 dots×200 dots (horizontal×vertical). It should be noted that although an LCD is used as the upper LCD 22 in the present embodiment, a display device using EL or the like may be used. Furthermore, a display device having any resolution may be used as the upper LCD 22.

The upper LCD 22 is a display device capable of displaying a stereoscopically visible image. The upper LCD 22 is capable of displaying a left-eye image and a right-eye image, using substantially the same display area. Specifically, the upper LCD 22 is a display device using a method in which the left-eye image and the right-eye image are displayed alternately in the horizontal direction in predetermined units (in every other line, for example). It should be noted that the upper LCD 22 may be a display device using a method in which the left-eye image and the right-eye image are displayed alternately for a predetermined time. Further, the upper LCD 22 is a display device capable of displaying an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively. In the present embodiment, the upper LCD 22 is of a parallax barrier type. The upper LCD 22 displays an image (stereoscopic image) stereoscopically visible with the naked eye, using the right-eye image and the left-eye image. That is, the upper LCD 22 allows the user to view the left-eye image with their left eye, and the right-eye image with their right eye, using the parallax barrier. This makes it possible to display a stereoscopic image (stereoscopically visible image) giving the user a stereoscopic effect. Furthermore, the upper LCD 22 is capable of disabling the parallax barrier. When disabling the parallax barrier, the upper LCD 22 is capable of displaying an image in a planar manner (the upper LCD 22 is capable of displaying a planar view image, as opposed to the stereoscopically visible image described above. This is a display mode in which the same displayed image can be viewed with both the left and right eyes.). Thus, the upper LCD 22 is a display device capable of switching between: the stereoscopic display mode for displaying a stereoscopically visible image; and the planar display mode for displaying an image in a planar manner (displaying a planar view image). The switching of the display modes is performed by the 3D adjustment switch 25 described later.

The "outer imaging section 23" is the collective term of the two imaging sections (the left outer imaging section 23a and the right outer imaging section 23b) provided on an outer surface (the back surface, which is the opposite side to the main surface including the upper LCD 22) 21D of the upper housing 21. The imaging directions of the left outer imaging section 23a and the right outer imaging section 23b are each the same as the outward normal direction of the outer surface 21D. Further, the left outer imaging section 23a and the right outer imaging section 23b are each designed so as to be placed 180 degrees opposite to the normal direction of the display surface (inner surface) of the upper LCD 22. That is, the imaging direction of the left outer imaging section 23a and the imaging direction of the right outer imaging section 23b are parallel to each other. The left outer imaging section 23a and the right outer imaging section 23b can be used as a stereo camera, depending on the program executed by the game apparatus 10. Alternatively, either one of the two outer imaging sections (the left outer imaging section 23a and the right outer imaging section 23b) may be used solely, so that the outer imaging section 23 can also be used as a non-stereo camera, depending on the program. Yet alternatively, depending on the program, images captured by the two outer imaging sections (the left outer imaging section 23a and the right outer imaging section 23b) may be combined with each other, or may be used to compensate for each other, so that imaging can be performed with an extended imaging range. In the present embodiment, the outer imaging section 23 includes two imaging sections, that is, the left outer imaging section 23a and the right outer imaging section 23b. The left outer imaging section 23a and the right outer imaging section 23b each includes an imaging device (a CCD image sensor or a CMOS image sensor, for example) having a predetermined common resolution, and a lens. The lens may have a zoom mechanism.

As indicated by dashed lines in FIG. 1 and solid lines in FIG. 3B, the left outer imaging section 23a and the right outer imaging section 23b included in the outer imaging section 23 are arranged parallel to the horizontal direction of the screen of the upper LCD 22. That is, the left outer imaging section 23a and the right outer imaging section 23b are placed such that a straight line connecting between the left outer imaging section 23a and the right outer imaging section 23b is parallel to the horizontal direction of the screen of the upper LCD 22. The dashed lines 23a and 23b in FIG. 1 indicate the left outer imaging section 23a and the right outer imaging section 23b, respectively, provided on the outer surface, which is the opposite side of the inner surface of the upper housing 21. As shown in FIG. 1, when the user views the screen of the upper LCD 22 from the front thereof, the left outer imaging section 23a is placed to the left of the upper LCD 22 and the right outer imaging section 23b is placed to the right of the upper LCD 22. When a program is executed for causing the outer imaging section 23 to function as a stereo camera, the left outer imaging section 23a captures a left-eye image, which is to be viewed with the user's left eye, and the right outer imaging section 23b captures a right-eye image, which is to be viewed with the user's right eye. The distance between the left outer imaging section 23a and the right outer imaging section 23b is set to correspond to the distance between both eyes of a person, and may be set, for example, in the range from 30 mm to 70 mm. The distance between the left outer imaging section 23a and the right outer imaging section 23b, however, is not limited to this range.

It should be noted that in the present embodiment, the left outer imaging section 23a and the right outer imaging section 23b are fixed to the housing, and therefore, the imaging directions cannot be changed.

The left outer imaging section 23a and the right outer imaging section 23b are placed symmetrically to each other with respect to the center of the upper LCD 22 (the upper housing 21) in the left-right direction. That is, the left outer imaging section 23a and the right outer imaging section 23b are placed symmetrically with respect to the line dividing the upper LCD 22 into two equal left and right portions. Further, the left outer imaging section 23a and the right outer imaging section 23b are placed in the upper portion of the upper housing 21 and in the back of the portion above the upper edge of the screen of the upper LCD 22, in the state where the upper housing 21 is in the open state. That is, the left outer imaging section 23a and the right outer imaging section 23b are placed on the outer surface of the upper housing 21, and, if the upper LCD 22 is projected onto the outer surface of the upper housing 21, is placed above the upper edge of the screen of the projected upper LCD 22.

Thus, the two imaging sections (the left outer imaging section 23a and the right outer imaging section 23b) of the outer imaging section 23 are placed symmetrically with respect to the center of the upper LCD 22 in the left-right direction. This makes it possible that when the user views the upper LCD 22 from the front thereof, the imaging directions of the outer imaging section 23 coincide with the directions of the respective lines of sight of the user's right and left eyes. Further, the outer imaging section 23 is placed in the back of the portion above the upper edge of the screen of the upper LCD 22, and therefore, the outer imaging section 23 and the upper LCD 22 do not interfere with each other inside the upper housing 21. This makes it possible to reduce the upper housing 21 in thickness as compared to the case where the outer imaging section 23 is placed in the back of the screen of the upper LCD 22.

The inner imaging section 24 is provided on the inner surface (main surface) 21B of the upper housing 21, and functions as an imaging section having an imaging direction that is the same as the inward normal direction of the inner surface. The inner imaging section 24 includes an imaging device (a CCD image sensor or a CMOS image sensor, for example) having a predetermined resolution, and a lens. The lens may have a zoom mechanism.

As shown in FIG. 1, when the upper housing 21 is in the open state, the inner imaging section 24 is placed: in the upper portion of the upper housing 21; above the upper edge of the screen of the upper LCD 22; and in the center of the upper housing 21 in the left-right direction (on the line dividing the upper housing 21 (the screen of the upper LCD 22) into two equal left and right portions). Specifically, as shown in FIGS. 1 and 3B, the inner imaging section 24 is placed on the inner surface of the upper housing 21 and in the back of the middle portion between the left outer imaging section 23a and the right outer imaging section 23b. That is, if the left outer imaging section 23a and the right outer imaging section 23b provided on the outer surface of the upper housing 21 are projected onto the inner surface of the upper housing 21, the inner imaging section 24 is placed at the middle portion between the projected left outer imaging section 23a and the projected right outer imaging section 23b. The dashed line 24 shown in FIG. 3B indicates the inner imaging section 24 provided on the inner surface of the upper housing 21.

Thus, the inner imaging section 24 captures an image in the opposite direction to that of the outer imaging section 23. The inner imaging section 24 is provided on the inner surface of the upper housing 21 and in the back of the middle portion between the two imaging sections of the outer imaging section 23. This makes it possible that when the user views the upper LCD 22 from the front thereof, the inner imaging section 24 captures the user's face from the front thereof. Further, the left outer imaging section 23a and the right outer imaging section 23b do not interfere with the inner imaging section 24 inside the upper housing 21. This makes it possible to reduce the upper housing 21 in thickness.

The 3D adjustment switch 25 is a slide switch, and is used to switch the display modes of the upper LCD 22 as described above. The 3D adjustment switch 25 is also used to adjust the stereoscopic effect of a stereoscopically visible image (stereoscopic image) displayed on the upper LCD 22. As shown in FIGS. 1 through 3D, the 3D adjustment switch 25 is provided at the end portions of the inner surface and the right side surface of the upper housing 21, and is placed so as to be visible to the user when the user views the upper LCD 22 from the front thereof. The 3D adjustment switch 25 includes a slider that is slidable to any position in a predetermined direction (the up-down direction, for example), and the display mode of the upper LCD 22 is set in accordance with the position of the slider.

When, for example, the slider of the 3D adjustment switch 25 is placed at the lowermost position, the upper LCD 22 is set to the planar display mode, and a planar image is displayed on the screen of the upper LCD 22. It should be noted that the same image may be used as the left-eye image and the right-eye image, while the upper LCD 22 remains set to the stereoscopic display mode, and thereby performs planar display. On the other hand, when the slider is placed above the lowermost position, the upper LCD 22 is set to the stereoscopic display mode. In this case, a stereoscopically visible image is displayed on the screen of the upper LCD 22. When the slider is placed above the lowermost position, the visibility of the stereoscopic image is adjusted in accordance with the position of the slider. Specifically, the amount of deviation in the horizontal direction between the position of the right-eye image and the position of the left-eye image is adjusted in accordance with the position of the slider.

The 3D indicator 26 indicates whether or not the upper LCD 22 is in the stereoscopic display mode. For example, the 3D indicator 26 is an LED, and is lit on when the stereoscopic display mode of the upper LCD 22 is enabled. As shown in FIG. 1, the 3D indicator 26 is placed on the inner surface of the upper housing 21 near the screen of the upper LCD 22. Accordingly, when the user views the screen of the upper LCD 22 from the front thereof, the user can easily view the 3D indicator 26. This enables the user to easily recognize the display mode of the upper LCD 22 even when viewing the screen of the upper LCD 22.

In addition, speaker holes 21E are provided on the inner surface of the upper housing 21. A sound from the speaker 43 described later is output through the speaker holes 21E.

Figure 4:
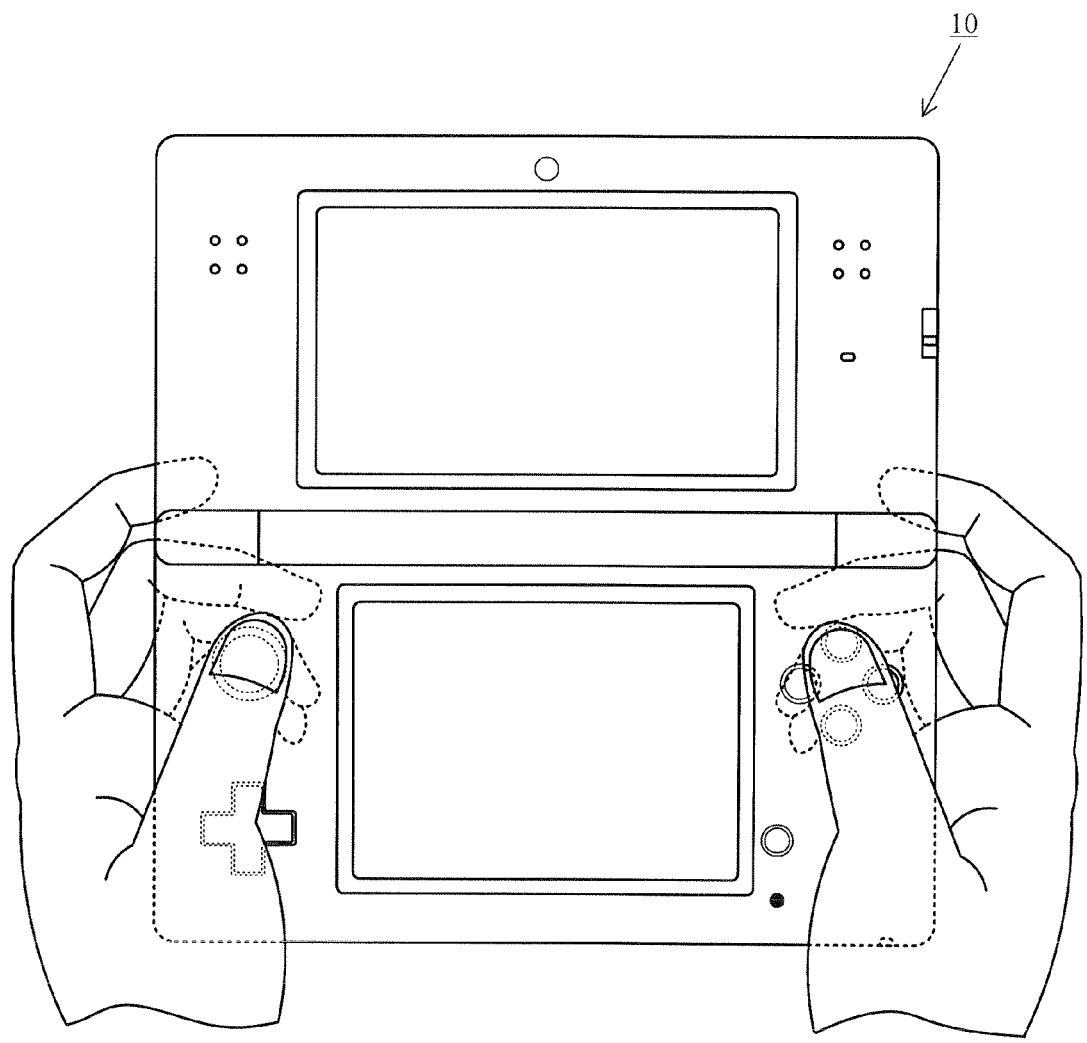
FIG. 4 is a diagram showing an example of a user holding the game apparatus 10 with both hands.
Figure 5:
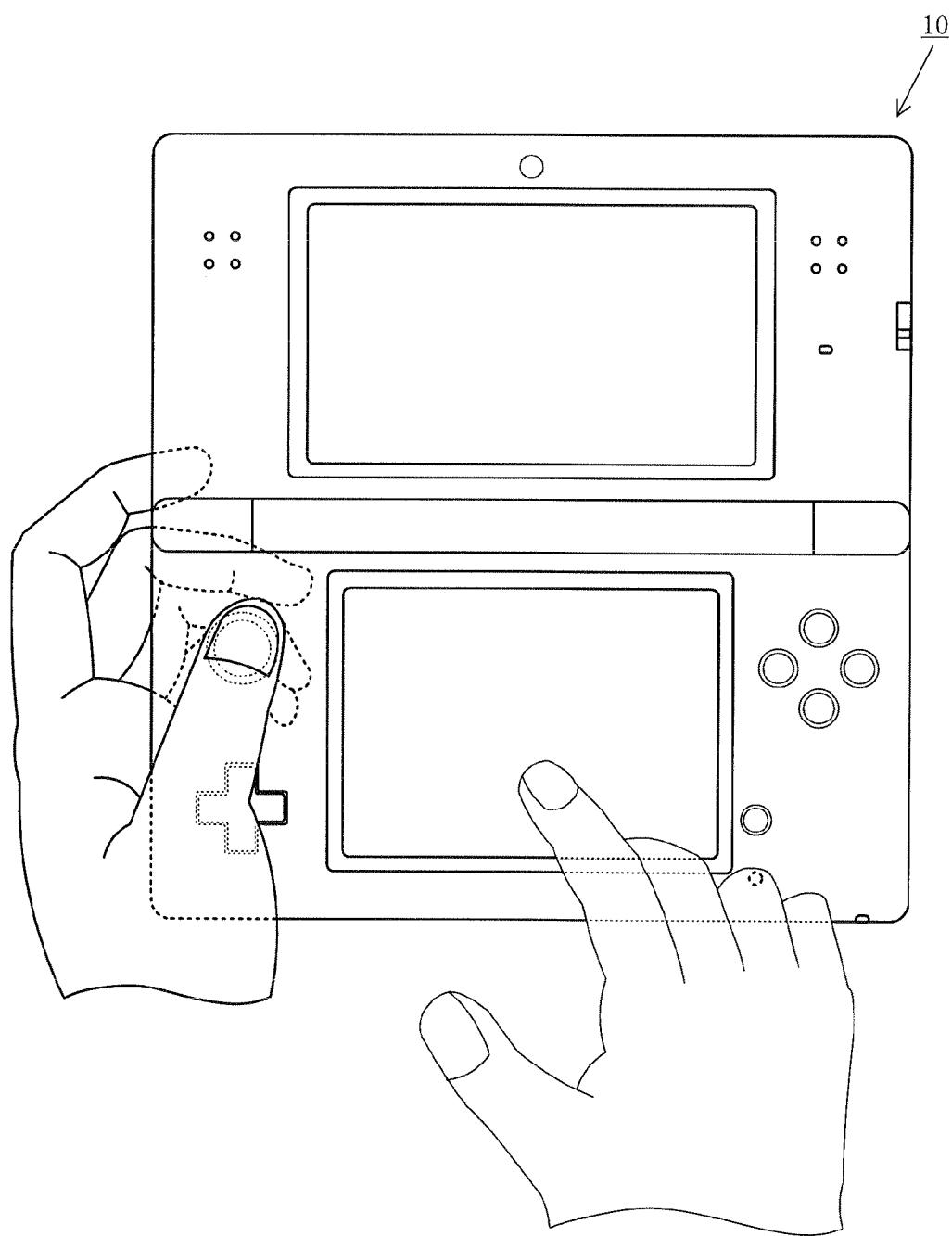
FIG. 5 is a diagram showing an example of a user holding the game apparatus 10 with one hand.

Next, with reference to FIGS. 4 and 5, an example is shown of the state of the use of the game apparatus 10. It should be noted that FIG. 4 is a diagram showing an example of a user holding the game apparatus 10 with both hands. FIG. 5 is a diagram showing an example of a user holding the game apparatus 10 with one hand.

As shown in FIG. 4, the user holds the side surfaces and the outer surface (the surface opposite to the inner surface) of the lower housing 11 with both palms, middle fingers, ring fingers, and little fingers, such that the lower LCD 12 and the upper LCD 22 face the user. Such holding enables the user to perform operations on the operation buttons 14A through 14E and the analog stick 15 with their thumbs, and to perform operations on the L button 14G and the R button 14H with their index fingers, while holding the lower housing 11. Further, as shown in FIG. 5, when an input is provided on the touch panel 13, one of the hands having held the lower housing 11 is released therefrom, and the lower housing 11 is held only with the other hand. This makes it possible to provide an input to the touch panel 13 with the one hand.

Figure 6:
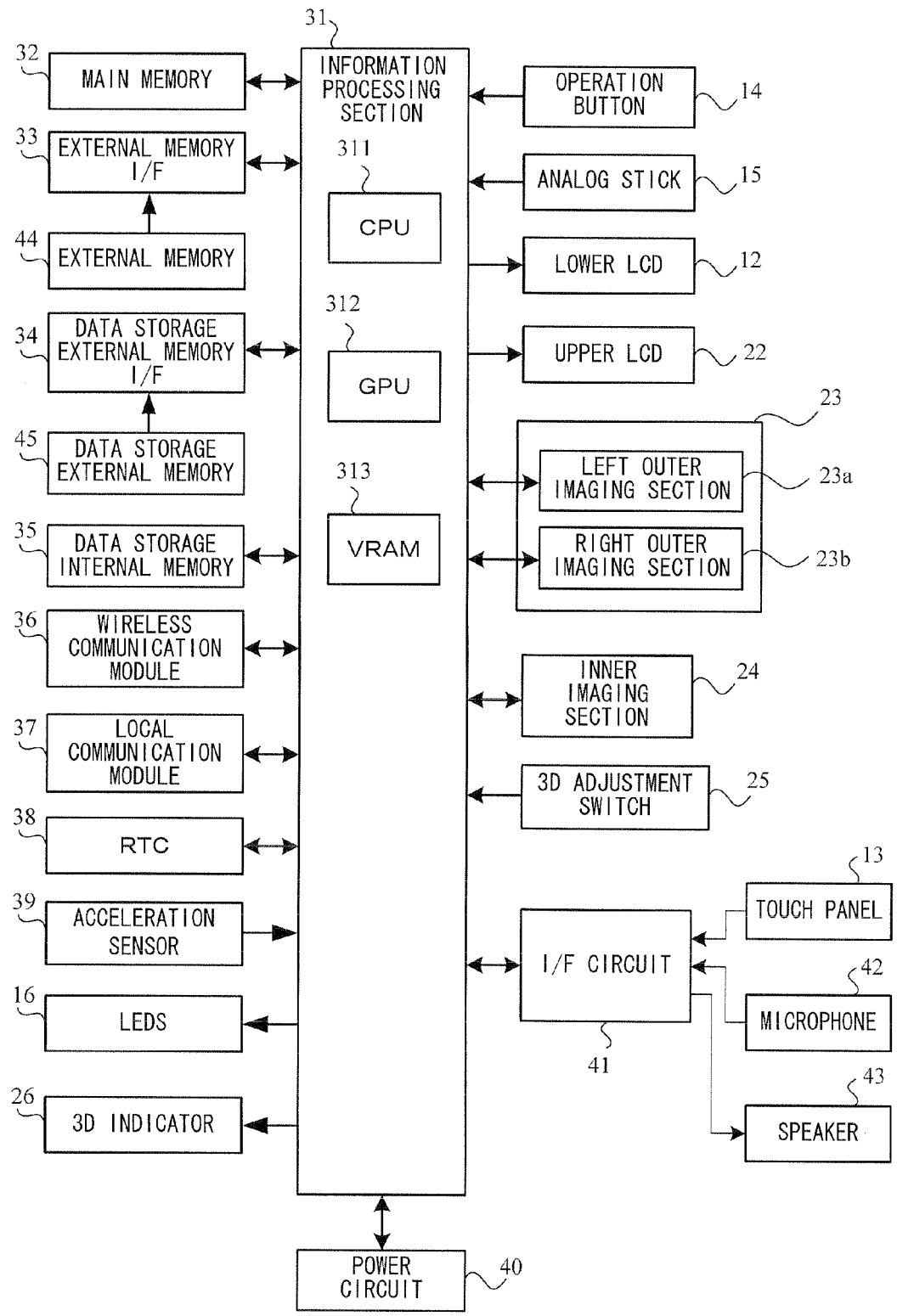
FIG. 6 is a block diagram showing an example of the internal configuration of the game apparatus 10.

Next, with reference to FIG. 6, a description is given of the internal configuration of the game apparatus 10. It should be noted that FIG. 6 is a block diagram showing an example of the internal configuration of the game apparatus 10.

Referring to FIG. 6, the game apparatus 10 includes, as well as the components described above, electronic components, such as an information processing section 31, a main memory 32, an external memory interface (external memory I/F) 33, a data storage external memory I/F 34, a data storage internal memory 35, a wireless communication module 36, a local communication module 37, a real-time clock (RTC) 38, an acceleration sensor 39, a power circuit 40, and an interface circuit (I/F circuit) 41. These electronic components are mounted on electronic circuit boards, and are accommodated in the lower housing 11 (or may be accommodated in the upper housing 21).

The information processing section 31 is information processing means including a central processing unit (CPU) 311 that executes a predetermined program, a graphics processing unit (GPU) 312 that performs image processing, and the like. In the present embodiment, a predetermined program is stored in a memory (for example, the external memory 44 connected to the external memory I/F 33, or the data storage internal memory 35) included in the game apparatus 10. The CPU 311 of the information processing section 31 executes the predetermined program, and thereby performs the image processing described later or game processing. It should be noted that the program executed by the CPU 311 of the information processing section 31 may be acquired from another device by communication with said another device. The information processing section 31 further includes a video RAM (VRAM) 313. The GPU 312 of the information processing section 31 generates an image in accordance with an instruction from the CPU 311 of the information processing section 31, and draws the image in the VRAM 313. The GPU 312 of the information processing section 31 outputs the image drawn in the VRAM 313 to the upper LCD 22 and/or the lower LCD 12, and the image is displayed on the upper LCD 22 and/or the lower LCD 12.

To the information processing section 31, the main memory 32, the external memory I/F 33, the data storage external memory I/F 34, and the data storage internal memory 35 are connected. The external memory I/F 33 is an interface for establishing a detachable connection with the external memory 44. The data storage external memory I/F 34 is an interface for establishing a detachable connection with the data storage external memory 45.

The main memory 32 is volatile storage means used as a work area or a buffer area of the information processing section 31 (the CPU 311). That is, the main memory 32 temporarily stores various types of data used for image processing or game processing, and also temporarily stores a program acquired from outside (the external memory 44, another device, or the like) the game apparatus 10. In the present embodiment, the main memory 32 is, for example, a pseudo SRAM (PSRAM).

The external memory 44 is nonvolatile storage means for storing the program executed by the information processing section 31. The external memory 44 is composed of, for example, a read-only semiconductor memory. When the external memory 44 is connected to the external memory I/F 33, the information processing section 31 can load a program stored in the external memory 44. In accordance with the execution of the program loaded by the information processing section 31, a predetermined process is performed. The data storage external memory 45 is composed of a readable/writable non-volatile memory (a NAND flash memory, for example), and is used to store predetermined data. For example, the data storage external memory 45 stores images captured by the outer imaging section 23 and/or images captured by another device. When the data storage external memory 45 is connected to the data storage external memory I/F 34, the information processing section 31 loads an image stored in the data storage external memory 45, and the image can be displayed on the upper LCD 22 and/or the lower LCD 12.

The data storage internal memory 35 is composed of a readable/writable non-volatile memory (a NAND flash memory, for example), and is used to store predetermined data. For example, the data storage internal memory 35 stores data and/or programs downloaded by wireless communication through the wireless communication module 36.

The wireless communication module 36 has the function of establishing connection with a wireless LAN by, for example, a method based on the IEEE 802.11.b/g standard. Further, the local communication module 37 has the function of wirelessly communicating with another game apparatus of the same type by a predetermined communication method (infrared communication, for example). The wireless communication module 36 and the local communication module 37 are connected to the information processing section 31. The information processing section 31 is capable of transmitting and receiving data to and from another device via the Internet, using the wireless communication module 36, and is capable of transmitting and receiving data to and from another game apparatus of the same type, using the local communication module 37.

The acceleration sensor 39 is connected to the information processing section 31. The acceleration sensor 39 detects the magnitudes of accelerations (linear accelerations) in the directions of straight lines along three axial (x, y, and z axes) directions, respectively. The acceleration sensor 39 is provided, for example, inside the lower housing 11. As shown in FIG. 1, the long side direction of the lower housing 11 is defined as an x-axis direction; the short side direction of the lower housing 11 is defined as a y-axis direction; and the direction perpendicular to the inner surface (main surface) of the lower housing 11 is defined as a z-axis direction. The acceleration sensor 39 thus detects the magnitudes of the linear accelerations produced in the respective axial directions. It should be noted that the acceleration sensor 39 is, for example, an electrostatic capacitance type acceleration sensor, but may be an acceleration sensor of another type. Further, the acceleration sensor 39 may be an acceleration sensor that detects an acceleration in one axial direction, or accelerations in two axial directions. The information processing section 31 receives data (acceleration data) representing the accelerations detected by the acceleration sensor 39, and calculates the orientation and the motion of the game apparatus 10.

The RTC 38 and the power circuit 40 are connected to the information processing section 31. The RTC 38 counts time, and outputs the counted time to the information processing section 31. The information processing section 31 calculates the current time (date) based on the time counted by the RTC 38. The power circuit 40 controls the power from the power supply (the rechargeable battery accommodated in the lower housing 11, which is described above) of the game apparatus 10, and supplies power to each component of the game apparatus 10.

The I/F circuit 41 is connected to the information processing section 31. A microphone 42, a speaker 43, and the touch panel 13 are connected to the I/F circuit 41. Specifically, the speaker 43 is connected to the I/F circuit 41 through an amplifier not shown in the figures. The microphone 42 detects a sound from the user, and outputs a sound signal to the I/F circuit 41. The amplifier amplifies the sound signal from the I/F circuit 41, and outputs the sound from the speaker 43. The I/F circuit 41 includes: a sound control circuit that controls the microphone 42 and the speaker 43 (amplifier); and a touch panel control circuit that controls the touch panel 13. For example, the sound control circuit performs A/D conversion and D/A conversion on the sound signal, and converts the sound signal to sound data in a predetermined format. The touch panel control circuit generates touch position data in a predetermined format, based on a signal from the touch panel 13, and outputs the touch position data to the information processing section 31. The touch position data represents the coordinates of the position (touch position), on the input surface of the touch panel 13, at which an input has been provided. It should be noted that the touch panel control circuit reads a signal from the touch panel 13, and generates the touch position data, once in a predetermined time. The information processing section 31 acquires the touch position data, and thereby recognizes the touch position, at which the input has been provided on the touch panel 13.

An operation button 14 includes the operation buttons 14A through 14L described above, and is connected to the information processing section 31. Operation data is output from the operation button 14 to the information processing section 31, the operation data representing the states of inputs provided to the respective operation buttons 14A through 14I (indicating whether or not the operation buttons 14A through 14I have been pressed). The information processing section 31 acquires the operation data from the operation button 14, and thereby performs processes in accordance with the inputs provided to the operation button 14.

The lower LCD 12 and the upper LCD 22 are connected to the information processing section 31. The lower LCD 12 and the upper LCD 22 each display an image in accordance with an instruction from the information processing section 31 (the GPU 312). In the present embodiment, the information processing section 31 causes the lower LCD 12 to display an image for a hand-drawn image input operation, and causes the upper LCD 22 to display an image acquired from either one of the outer imaging section 23 and the inner imaging section 24. That is, for example, the information processing section 31 causes the upper LCD 22 to display a stereoscopic image (stereoscopically visible image) using a right-eye image and a left-eye image that are captured by the inner imaging section 24, or causes the upper LCD 22 to display a planar image using one of a right-eye image and a left-eye image that are captured by the outer imaging section 23.

Specifically, the information processing section 31 is connected to an LCD controller (not shown) of the upper LCD 22, and causes the LCD controller to set the parallax barrier to on/off. When the parallax barrier is on in the upper LCD 22, a right-eye image and a left-eye image that are stored in the VRAM 313 of the information processing section 31 (that are captured by the outer imaging section 23) are output to the upper LCD 22. More specifically, the LCD controller repeatedly alternates the reading of pixel data of the right-eye image for one line in the vertical direction, and the reading of pixel data of the left-eye image for one line in the vertical direction, and thereby reads the right-eye image and the left-eye image from the VRAM 313. Thus, the right-eye image and the left-eye image are each divided into strip images, each of which has one line of pixels arranged in the vertical direction, and an image including the divided left-eye strip images and the divided right-eye strip images alternately arranged is displayed on the screen of the upper LCD 22. The user views the images through the parallax barrier of the upper LCD 22, whereby the right-eye image is viewed with the user's right eye, and the left-eye image is viewed with the user's left eye. This causes the stereoscopically visible image to be displayed on the screen of the upper LCD 22.

The outer imaging section 23 and the inner imaging section 24 are connected to the information processing section 31. The outer imaging section 23 and the inner imaging section 24 each capture an image in accordance with an instruction from the information processing section 31, and output data of the captured image to the information processing section 31. In the present embodiment, the information processing section 31 gives either one of the outer imaging section 23 and the inner imaging section 24 an instruction to capture an image, and the imaging section that has received the instruction captures an image, and transmits data of the captured image to the information processing section 31. Specifically, the user selects the imaging section to be used, through an operation using the touch panel 13 and the operation button 14. The information processing section 31 (the CPU 311) detects that an imaging section has been selected, and the information processing section 31 gives the selected one of the outer imaging section 32 and the inner imaging section 24 an instruction to capture an image.

The 3D adjustment switch 25 is connected to the information processing section 31. The 3D adjustment switch 25 transmits to the information processing section 31 an electrical signal in accordance with the position of the slider.

The 3D indicator 26 is connected to the information processing section 31. The information processing section 31 controls whether or not the 3D indicator 26 is to be lit on. When, for example, the upper LCD 22 is in the stereoscopic display mode, the information processing section 31 lights on the 3D indicator 26.

Next, before a description is given of specific processing operations performed by the image processing program executed by the game apparatus 10, a description is given, with reference to FIGS. 7 through 11B, of examples of the forms of display performed on the lower LCD 12 and the upper LCD 22 by the image processing operations, and the like. It should be noted that FIGS. 7 through 11B are diagrams showing examples of process steps until a hand-drawn input provided through the touch panel 13 causes a hand-drawn image HI corresponding to the hand-drawn input to be displayed on a camera image displayed on the upper LCD 22. It should be noted that for ease of description, an example is where a planar image (a planar view image, as opposed to the stereoscopically visible image described above) of the real world based on a camera image acquired from either one of the outer imaging section 23 and the inner imaging section 24 is displayed on the lower LCD 12 and the upper LCD 22.

Figure 7:
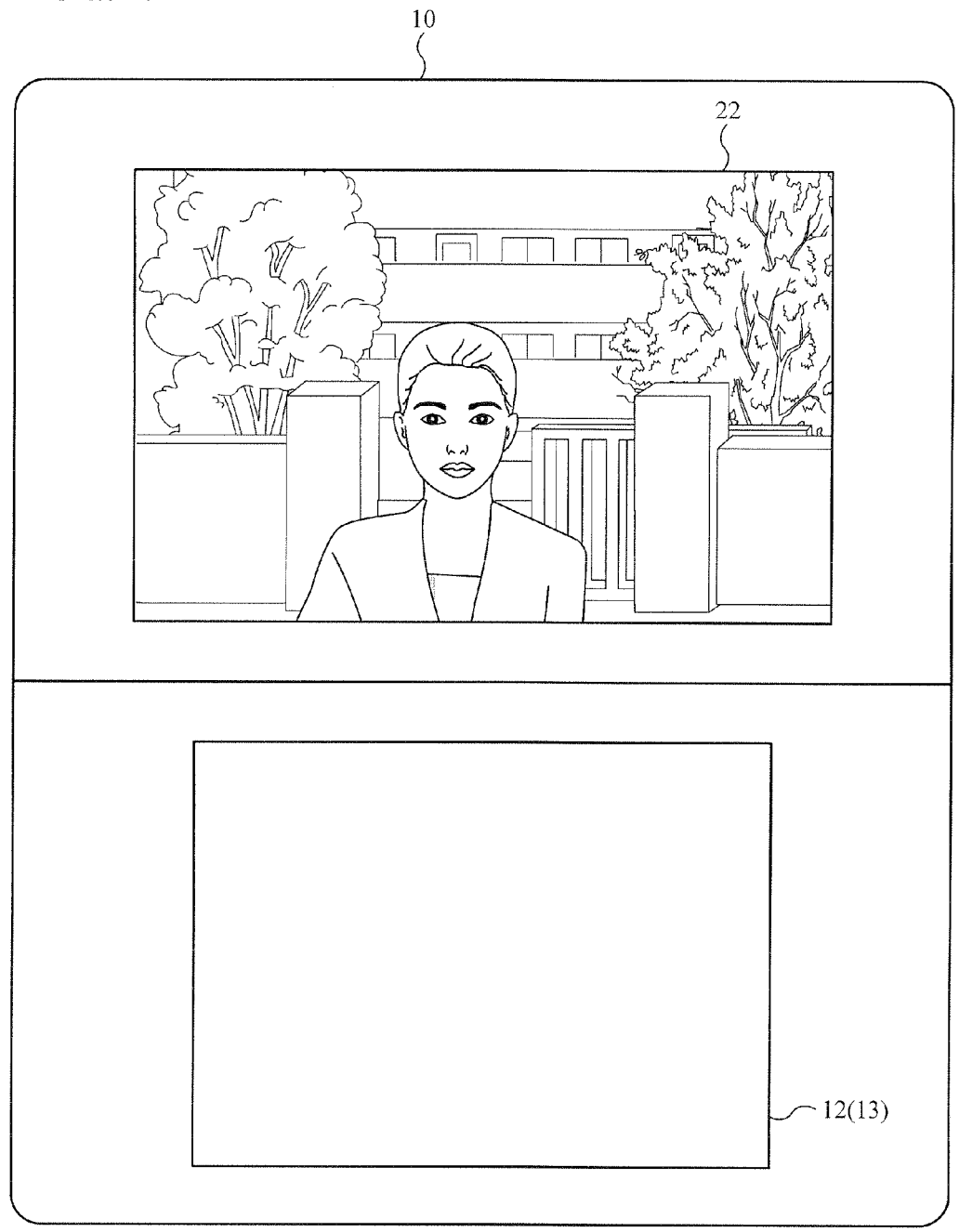
FIG. 7 is a diagram showing an example of a process step until a hand-drawn input provided through a touch panel 13 causes a hand-drawn image HI corresponding to the hand-drawn input to be displayed on a camera image displayed on an upper LCD 22.

Referring to FIG. 7, on the upper LCD 22, a camera image is displayed, which is a real world image captured by a real camera (the outer imaging section 23, for example) built into the game apparatus 10. In the example of FIG. 7, on the upper LCD 22, a camera image is displayed, in which a person in the real world is captured. For example, a real-time real world image captured by the real camera built into the game apparatus 10 is displayed on the upper LCD 22.

Figure 8:
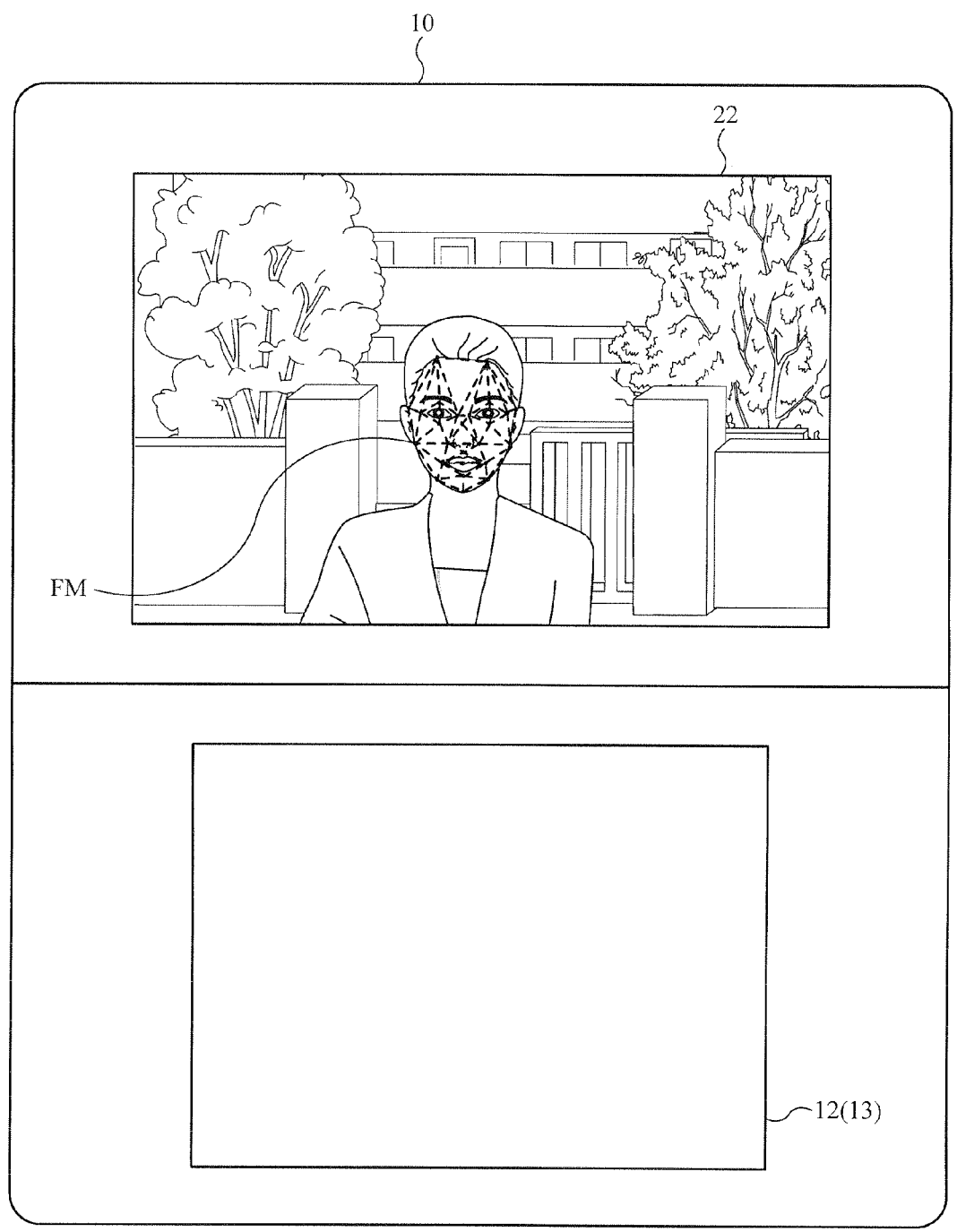
FIG. 8 is a diagram showing an example of a process step until the hand-drawn input provided through the touch panel 13 causes the hand-drawn image HI corresponding to the hand-drawn input to be displayed on the camera image displayed on the upper LCD 22.

The game apparatus 10 sequentially performs a predetermined face recognition process on camera images captured by the real camera, and determines the presence or absence of a person's face in the camera images. When having determined in the face recognition process that a person's face is present in the camera image, the game apparatus 10 extracts from the camera image the part recognized as a face. The game apparatus 10 provides a predetermined sign on the part recognized as a face, and displays the sign on the upper LCD 22, together with the camera image in which the face has been recognized. For example, as shown in FIG. 8, the game apparatus 10 displays in the camera image a mesh line drawing (a face mesh FM) covering the entire part recognized as a face, and thereby informs the user of the game apparatus 10 that a face has been recognized in a real-time real world image, and also informs the user of the part recognized as a person's face.

Figure 9:
FIG. 9 is a diagram showing an example of a process step until the hand-drawn input provided through the touch panel 13 causes the hand-drawn image HI corresponding to the hand-drawn input to be displayed on the camera image displayed on the upper LCD 22.

In accordance with a predetermined operation (for example, the operation of pressing the button 14B (A button)) performed by the user in the state where it is determined that a person's face is present in the camera image, a hand-drawn-image-input image is displayed on the lower LCD 12. For example, the hand-drawn-image-input image is a still image of the camera image in which it is determined that a person's face is present, and is also the camera image displayed on the upper LCD 22 when the predetermined operation has been performed (that is, the camera image in which it is determined that a person's face is present). This enables the user to provide a hand-drawn input through the touch panel 13 on the hand-drawn-image-input image displayed on the lower LCD 12. For example, as shown in FIG. 9, the camera image shown in FIG. 8 (that is, the camera image in which it is determined that a person's face is present) is displayed on the lower LCD 12, and the user is providing a hand-drawn input HW on the image displayed on the lower LCD 12. The hand-drawn input HW is the touch track of a touch input provided by the user from when the user performs a touch-on operation on the touch panel 13 to when the user performs a touch-off operation. The repetition of touch-on operations and touch-off operations on the touch panel 13 by the user makes it possible to provide a plurality of touch tracks as the hand-drawn input HW. The hand-drawn input HW provided by the user is drawn on the hand-drawn-image-input image as an image representing the touch track (for example, a solid line representing the track), at the position overlapping the touch input.

As shown in FIG. 9, the hand-drawn input HW provided on the hand-drawn-image-input image displayed on the lower LCD 12 is also drawn as a hand-drawn image HI on the camera image displayed on the upper LCD 22. Specifically, when the user provides a hand-drawn input HW on the person's face image in the hand-drawn-image-input image, a hand-drawn image HI similar in shape to the hand-drawn input HW is also drawn on the person's face image in the camera image displayed on the upper LCD 22.

Figure 10:
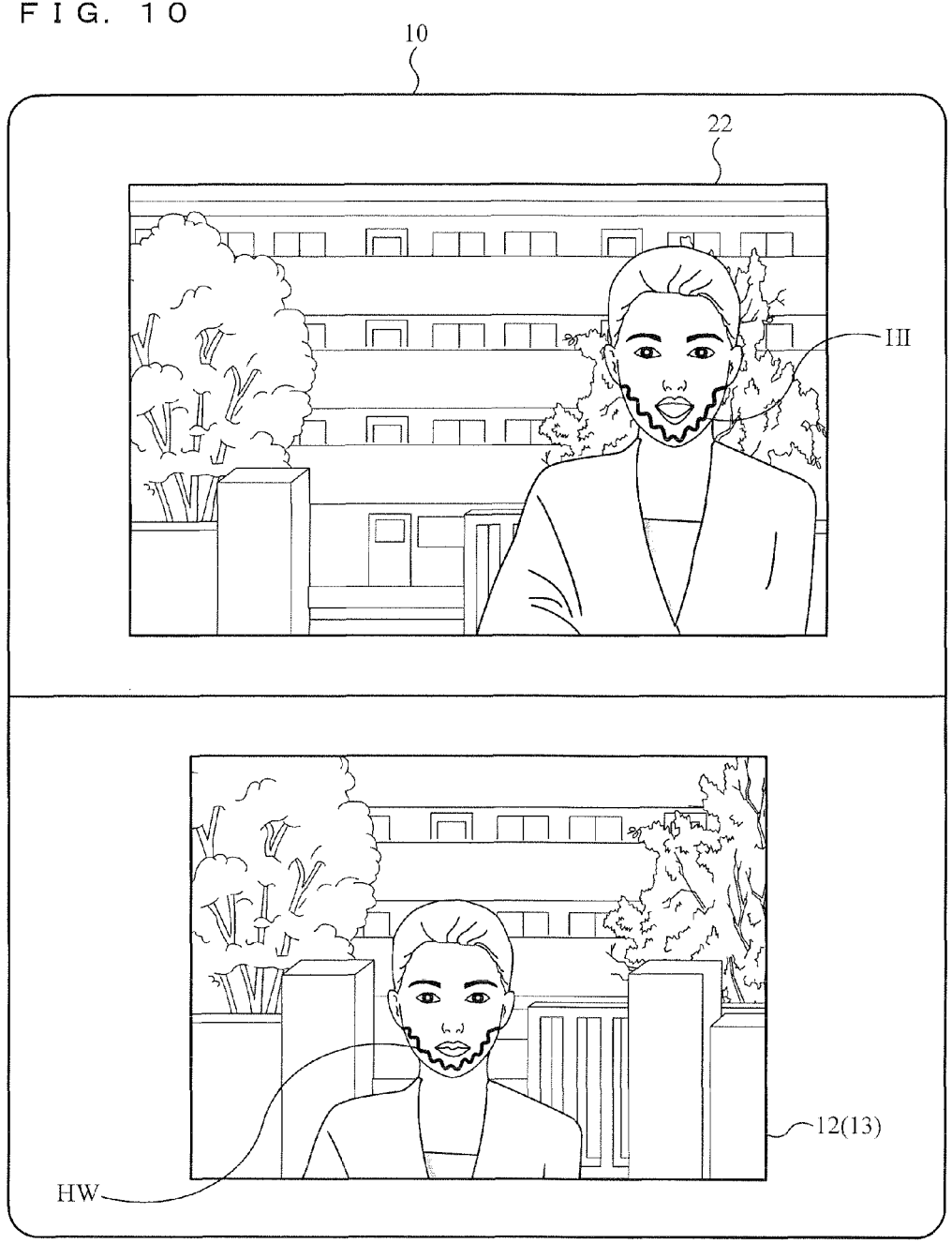
FIG. 10 is a diagram showing an example of a process step until the hand-drawn input provided through the touch panel 13 causes the hand-drawn image HI corresponding to the hand-drawn input to be displayed on the camera image displayed on the upper LCD 22.

Here, as described above, a real-time real world image captured by the real camera built into the game apparatus 10 is displayed on the upper LCD 22. Accordingly, changes in the orientation and the position of the game apparatus 10 in real space also change the real-time real world image captured by the game apparatus 10, and therefore also change the camera image displayed on the upper LCD 22. In this case, the game apparatus 10 sequentially performs a face recognition process also on the camera image after the change, and draws the hand-drawn image HI corresponding to the hand-drawn input HW on the face extracted in the face recognition process. For example, as shown in FIG. 10, the hand-drawn-image-input image (still image) shown in FIG. 9 is displayed unchanged on the lower LCD 12. In contrast, the camera image displayed on the upper LCD 22 has changed, in capturing position and angle, from the camera image displayed on the upper LCD 22 shown in FIG. 9, and therefore, the position and the size of the captured person has changed. Even when the camera image displayed on the upper LCD 22 has thus changed, the hand-drawn image HI corresponding to the hand-drawn input HW is drawn on the person's face extracted in the face recognition process performed on the camera image after the change.

Figure 11A:
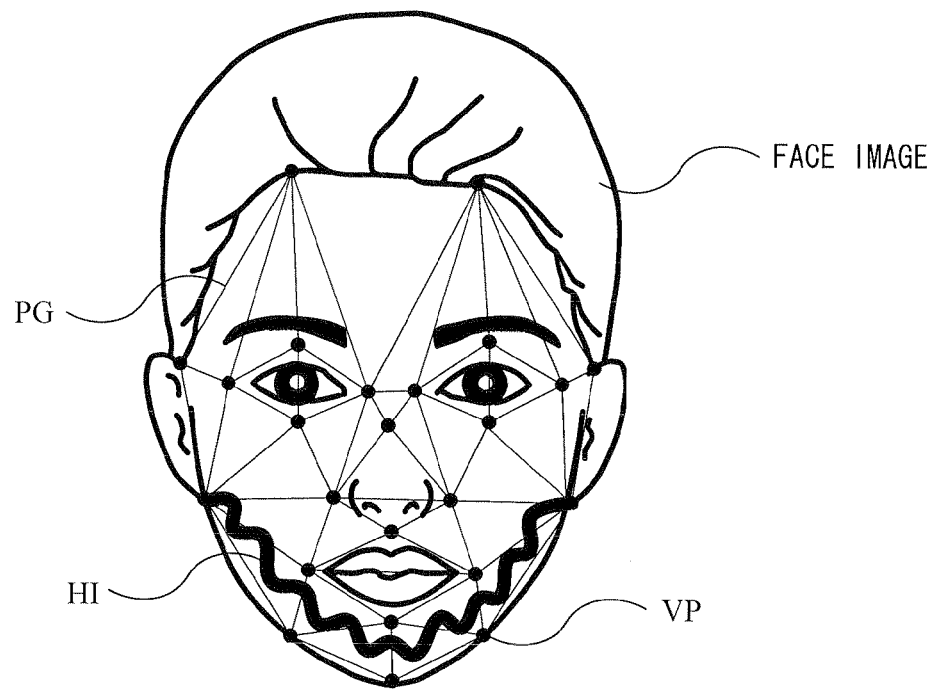
FIG. 11A is a diagram showing an example of a plurality of polygons PG being generated based on the feature points of a face recognized in a face recognition process.

In addition, changes in the expression of the person who is being captured in real space also change the expression of the person in the real-time real world image captured by the game apparatus 10. When the expression of the person in the camera image displayed on the upper LCD 22 has thus changed, the shape of the hand-drawn image HI drawn on the person's face is also changed in accordance with the changes in the expression. For example, as shown in FIG. 11A, on the face recognized in the face recognition process, a plurality of polygons PG are generated based on the feature points of the face. A texture of the hand-drawn image HI corresponding to the hand-drawn input HW is set, and the texture is mapped on the plurality of polygons PG. This causes the hand-drawn image HI to be drawn on the face in the camera image. As is clear by comparing FIGS. 11A and 11B, when the facial expression of the face image in the camera image has changed (for example, when the state where the mouth is closed has changed to the state where the mouth is open), the positions of the vertices of the polygons PG set based on the feature points of the face also change. Consequently, the positions and the shapes of the polygons PG also change, and therefore, the shape of the hand-drawn image HI also changes in accordance with the changes in the polygons PG.

Specifically, when the position of the face image in the camera image displayed on the upper LCD 22 has moved, the positions of the feature points of the face also move. Accordingly, the positions of the vertices of the polygons PG set based on the positions of the feature points also move. Consequently, the positions of the polygons PG corresponding to the camera image also move, and therefore, the display position of the hand-drawn image HI also moves in accordance with the movements of the polygons PG. Alternatively, when the display angle of the face image in the camera image displayed on the upper LCD 22 has changed, the positions of the plurality of feature points extracted from the face also rotate in accordance with the change in the display angle. Accordingly, the positions of the vertices of the polygons PG set based on the positions of the feature points also rotate. Consequently, the positions of the polygons PG corresponding to the camera image also rotate, and therefore, the display angle of the hand-drawn image HI also changes in accordance with the rotations of the polygons PG. Yet alternatively, when the size and the shape of the face image in the camera image displayed on the upper LCD 22 have changed, the distances between the plurality of feature points extracted from the face also change. Accordingly, the distances between the vertices of the polygons PG set based on the positions of the feature points also change. Consequently, the sizes and the shapes of the polygons PG corresponding to the camera image also change, and therefore, the display size and the shape of the hand-drawn image HI also change in accordance with the changes in the polygons PG. Specifically, when the size of the face image has increased, the distances between the plurality of feature points extracted from the face also increase. Thus, the distances between the vertices of the polygons PG set based on the positions of the feature points also increase, and therefore, the sizes of the polygons PG also increase. Further, when the shape of a part of the face image has changed, the distances between the feature points extracted from the part that has changed in shape change, among all the plurality of feature points extracted from the face. Thus, the distances between the vertices of the polygons PG set based on the positions of the feature points also change at the changed part, and therefore, the shapes of the polygons PG placed at the changed part also change.

It should be noted that the person on whose face image the hand-drawn image HI is drawn may not need to be the same as the person on whose face image the hand-drawn input HW has been provided using the hand-drawn-image-input image. When a face is recognized as a person's face in a face recognition process performed on a camera image, the hand-drawn image HI can be drawn on the recognized face. Further, the person on whose face image the hand-drawn image HI is drawn may be a plurality of people. When the faces of a plurality of people are recognized in a face recognition process performed on a camera image, the hand-drawn image HI can also be drawn on each of the recognized faces.

Figure 12:
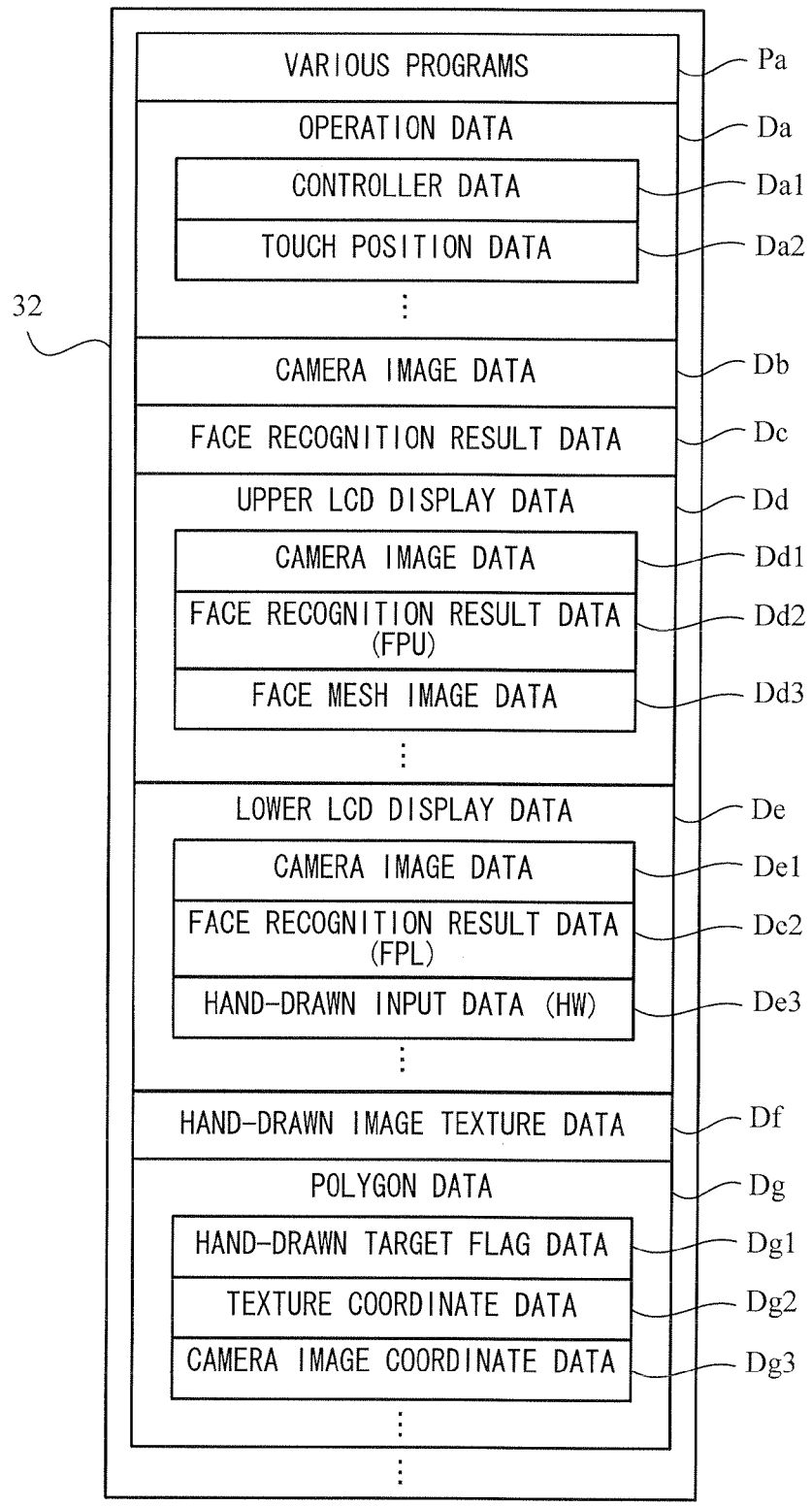
FIG. 12 is a diagram showing an example of various data stored in a main memory 32 in accordance with the execution of an image processing program.
Figure 13:
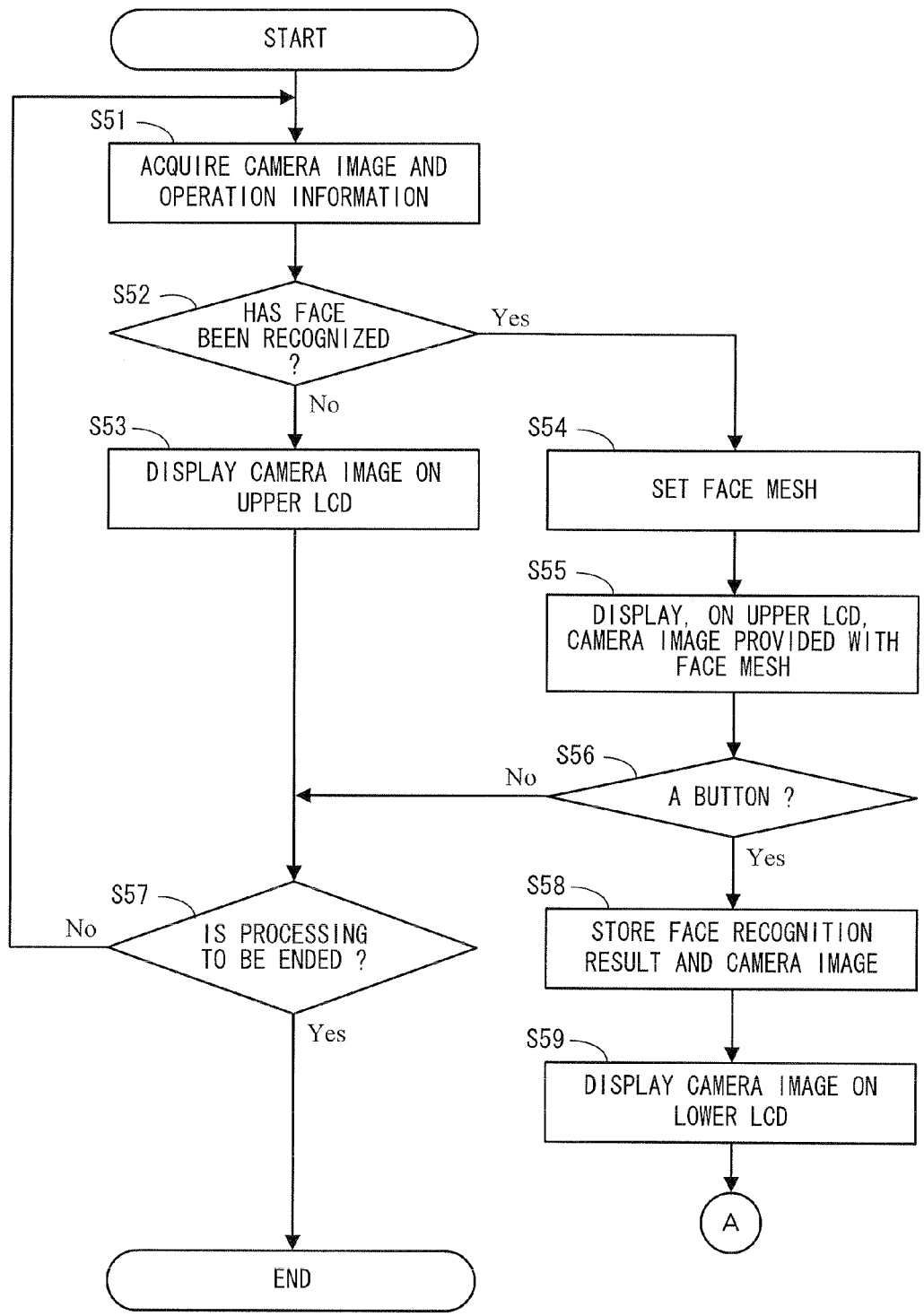
FIG. 13 is the first half of a flow chart showing an example of the operation of image processing performed by the game apparatus 10 in accordance with the execution of the image processing program.
Figure 14:
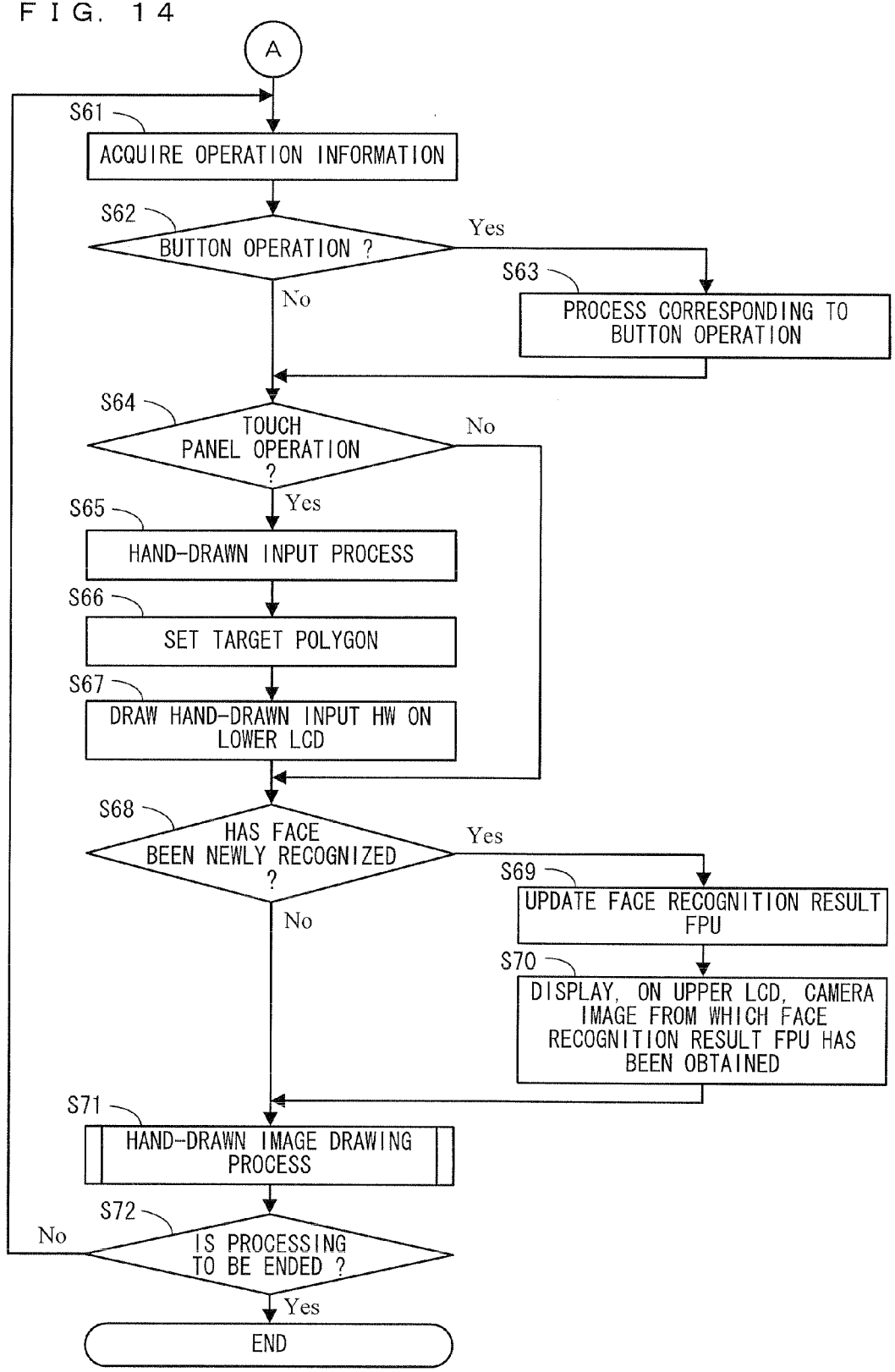
FIG. 14 is the last half of the flow chart showing an example of the operation of the image processing performed by the game apparatus 10 in accordance with the execution of the image processing program.
Figure 15:
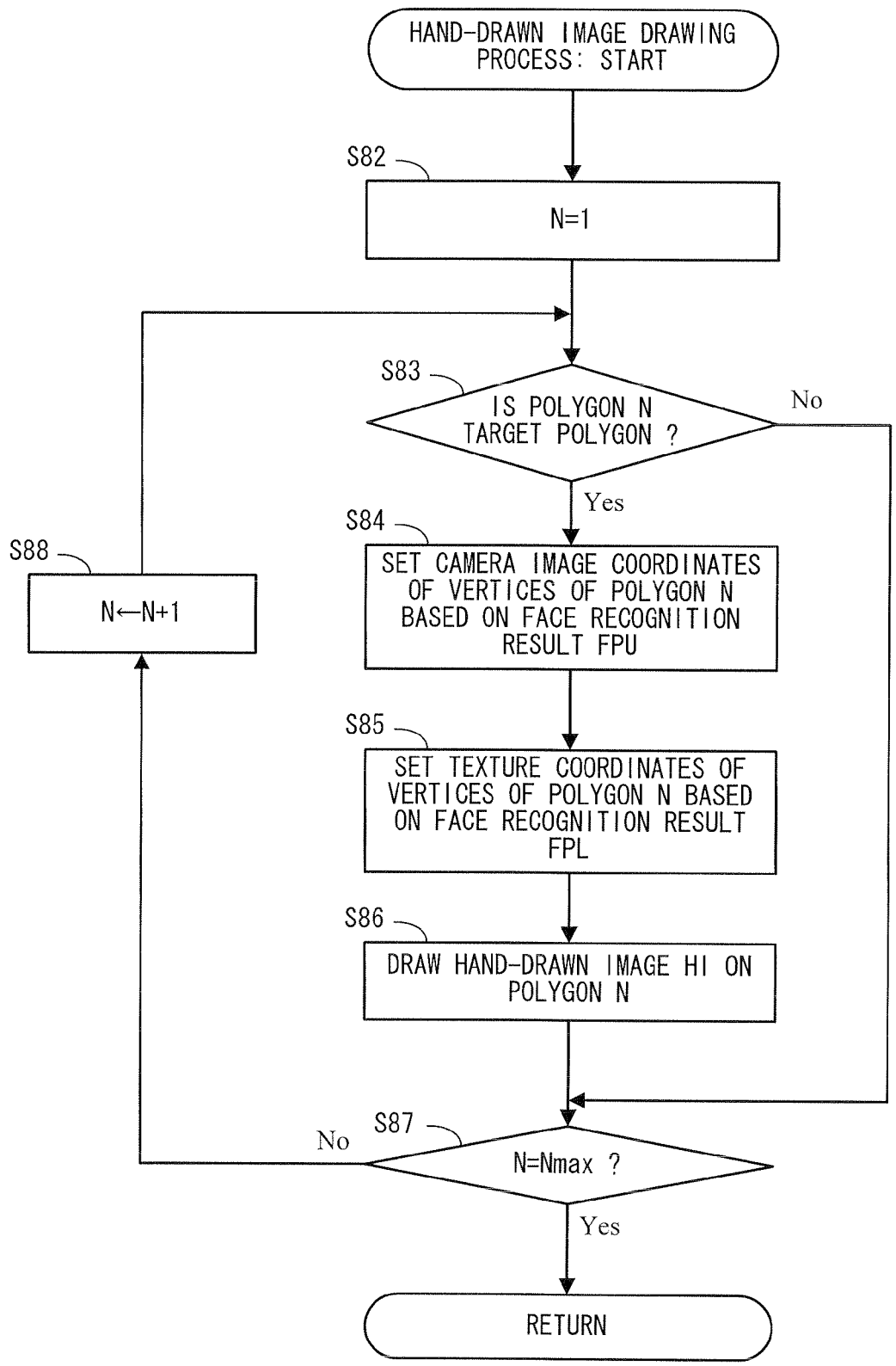
FIG. 15 is a subroutine showing an example of a detailed operation of a hand-drawn image drawing process performed in step 71 of FIG. 14.

Next, with reference to FIGS. 12 through 15, a description is given of specific processing operations performed by the image processing program executed by the game apparatus 10. It should be noted that FIG. 12 is a diagram showing an example of various data stored in the main memory 32 in accordance with the execution of the image processing program. FIG. 13 is the first half of a flow chart showing an example of the operation of image processing performed by the game apparatus 10 in accordance with the execution of the image processing program. FIG. 14 is the last half of the flow chart showing an example of the operation of the image processing performed by the game apparatus 10 in accordance with the execution of the image processing program. FIG. 15 is a subroutine showing an example of a detailed operation of a hand-drawn image drawing process performed in step 71 of FIG. 14. It should be noted that programs for performing these processes are: included in a memory (the data storage internal memory 35, for example) built into the game apparatus 10, or included in the external memory 44 or the data storage external memory 45; loaded from the built-in memory, or loaded from the external memory 44 through the external memory I/F 33 or from the data storage external memory 45 through the data storage external memory I/F 34, into the main memory 32 when the game apparatus 10 is turned on; and executed by the CPU 311.

Referring to FIG. 12, the main memory 32 stores the programs loaded from the built-in memory, the external memory 44, or the data storage external memory 45, and temporary data generated in the image processing. Referring to FIG. 12, the data storage area of the main memory 32 stores operation data Da, camera image data Db, face recognition result data Dc, upper LCD data Dd, lower LCD data De, hand-drawn image texture data Df, polygon data Dg, and the like. Further, the program storage area of the main memory 32 stores group of various programs Pa forming the image processing program.

The operation data Da represents operation information about an operation of the user on the game apparatus 10. The operation data Da includes controller data Da1 and touch position data Da2. The controller data Da1 indicates that the user has operated a controller, such as the operation button 14 or the analog stick 15, of the game apparatus 10. The touch position data Da2 is data of touch coordinates representing the touch position, based on the screen coordinate system, at which the user is touching the touch panel 13. For example, the operation data from the operation button 14 or the analog stick 15 and the touch coordinate data from the touch panel 13 are: acquired per unit of time (1/60 seconds, for example) in which the game apparatus 10 performs the processes; stored in the controller data Da1 and the touch position data Da2, respectively, in accordance with the acquisition; and updated. It should be noted that in the touch position data Da2, data is stored that represents the history of the touch coordinates (for example, at least the touch coordinates obtained in the previous process and the touch coordinates obtained in the current process) so as to cover a predetermined length of time required for the processes described later. When the user is not touching the touch panel 13, null values are stored.

The camera image data Db represents a camera image captured by either one of the outer imaging section 23 and the inner imaging section 24. In the descriptions of the later processes, in the step of acquiring a camera image, the camera image data Db is updated using the camera image captured by either one of the outer imaging section 23 and the inner imaging section 24. It should be noted that the period of updating the camera image data Db using the camera image captured by the outer imaging section 23 or the inner imaging section 24 may be the same as the unit of time (1/60 seconds, for example) in which the game apparatus 10 performs the processes, or may be shorter than this unit of time. When the period of updating the camera image data Db is shorter than the period of the game apparatus 10 performing the processes, the camera image data Db may be updated as necessary, independently of the processing described later. In this case, in the step described later of acquiring a camera image, the process may be performed invariably using the most recent camera image represented by the camera image data Db.

The face recognition result data Dc represents the result of a face recognition process performed sequentially on camera images. For example, the face recognition result data Dc includes: data indicating whether or not a person's face has been recognized in a face recognition process performed on the camera image; and data representing the part recognized as a face in the camera image. It should be noted that the face recognition process may be performed sequentially using camera images, independently of the image processing described later. In this case, the face recognition result data Dc may possibly be updated as appropriate in a period different from the unit of time (1/60 seconds, for example) in which the game apparatus 10 performs the processes.

The upper LCD data Dd is data of an image displayed on the upper LCD 22, and includes camera image data Dd1, face recognition result data Dd2, face mesh image data Dd3, and the like. The camera image data Dd1 represents a camera image displayed on the upper LCD 22. The face recognition result data Dd2 represents the result of a face recognition process (a face recognition result FPU) performed on the camera image displayed on the upper LCD 22. The face mesh image data Dd3 is data of a face mesh FM displayed on the part recognized as a person's face in the camera image displayed on the upper LCD 22.

The lower LCD data De is data of an image displayed on the lower LCD 12, and includes camera image data De1, face recognition result data De2, hand-drawn input data De3, and the like. The camera image data De1 represents a hand-drawn-image-input image (for example, a camera image in which a person's face has been recognized) displayed on the lower LCD 12. The face recognition result data Dd2 represents the result of a face recognition process (a face recognition result FPL) performed on the hand-drawn-image-input image. The hand-drawn input data De3 represents a hand-drawn input HW provided by a touch input through the touch panel 13.

The hand-drawn image texture data Df represents a texture of a hand-drawn image created based on a hand-drawn input HW provided by a touch input through the touch panel 13.

The polygon data Dg represents each of a plurality of polygons PG generated based on the feature points of a face recognized in a face recognition process, and includes hand-drawn target flag data Dg1, texture coordinate data Dg2, camera image coordinate data Dg3, and the like. The hand-drawn target flag data Dg1 represents a hand-drawn target flag indicating whether or not the polygons include a hand-drawn image HI when the texture of the hand-drawn image is mapped. The texture coordinate data Dg2 represents the texture coordinates of the vertices VP of the polygons PG placed when the texture of the hand-drawn image is mapped. The camera image coordinate data Dg3 represents the camera image coordinates corresponding to the vertices VP of the polygons PG placed in the camera image displayed on the upper LCD 22.

Next, with reference to FIG. 13, a description is given of the operation of the information processing section 31. First, when the power (the power button 14F) of the game apparatus 10 is turned on, the CPU 311 executes a boot program (not shown). This causes the programs stored in the built-in memory, the external memory 44, or the data storage external memory 45, to be loaded into the main memory 32. In accordance with the execution of the loaded programs by the information processing section 31 (the CPU 311), the steps (abbreviated as "S" in FIGS. 13 through 15) shown in FIG. 13 are performed. It should be noted that in FIGS. 13 through 15, processes not directly related to the present invention are not described.

Referring to FIG. 13, the information processing section 31 acquires a camera image and operation information (step 51), and proceeds to the subsequent step. For example, the information processing section 31 updates the camera image data Db, using a camera image captured by the currently selected imaging section (the outer imaging section 23 or the inner imaging section 24). The information processing section 31 also acquires data indicating that the operation button 14 or the analog stick 15 has been operated, and updates the controller data Da1.

Subsequently, the information processing section 31 determines whether or not a person's face has been recognized in the camera image in a predetermined face recognition process performed on the camera image represented by the camera image data Db (step 52). When a person's face has not been recognized in the camera image, the information processing section 31 proceeds to step 53. On the other hand, when a person's face has been recognized in the camera image, the information processing section 31 updates the face recognition result data Dc, using the face recognition result data indicating that a person's face has been recognized, and proceeds to step 54. Here, the face recognition process may be performed sequentially by the information processing section 31, using camera images, independently of the processing of the flow chart shown in FIG. 13, or may be performed by the information processing section 31 in the process of step 52 described above. In the first case, a positive determination is made in step 52 by acquiring a face recognition result indicating that a person's face has been recognized in the camera image. In the second case, a positive determination is made in step 52 when a person's face has been recognized in the camera image in the process of step 52.

In step 53, the information processing section 31 displays on the upper LCD 22 the camera image acquired in step 51, and proceeds to step 57. For example, the CPU 311 of the information processing section 31 stores in the VRAM 313 the camera image represented by the camera image data Db. The GPU 312 of the information processing section 31 outputs to the upper LCD 22 the image drawn in the VRAM 313, and thereby displays the image on the upper LCD 22.

Figure 11B:
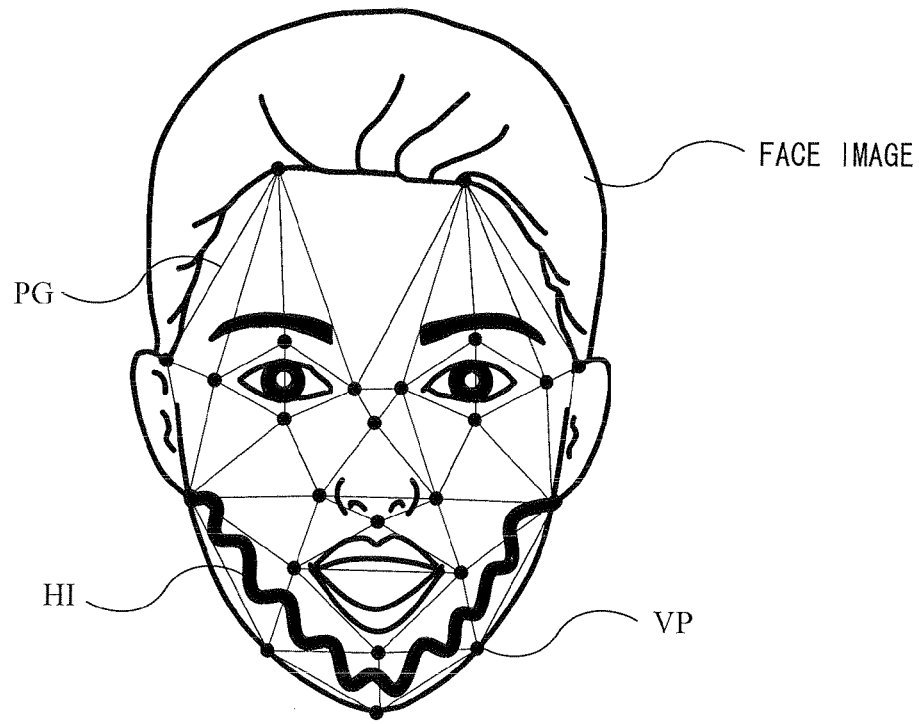
FIG. 11B is a diagram showing an example of the plurality of polygons PG being generated based on the feature points of the face recognized in the face recognition process.

In step 54, on the other hand, the information processing section 31 sets a face mesh FM on the face recognized in the camera image, and proceeds to the subsequent step. For example, based on a plurality of feature points of the face recognized in the camera image, the information processing section 31 sets a plurality of polygons to be set on the face, and updates the polygon data Dg based on the plurality of set polygons. The information processing section 31 sets a line drawing representing the set polygons such that the line drawing serves as a face mesh FM (see FIG. 8), and updates the face mesh image data Dd3. Specifically, as shown in FIGS. 11A and 11B, a plurality of polygons PG are set, on the face image representing the face recognized in the camera image, and within the outline of the face image. The plurality of polygons PG are set as triangles based on the plurality of corresponding feature points of the recognized face, and the coordinates (camera image coordinates) representing the positions of the vertices of the polygons in the camera image are set in the camera image coordinate data Dg3. Here, using known software, the plurality of feature points of the face are detected by performing image processing, such as edge detection, on the face image representing the face recognized in the captured camera image, the feature points including the following in the face image: the outer corners of the eyes; the inner corners of the eyes; the tip of the nose; both corners of the mouth; the inner ends of the eyebrows; the centers of the eyebrows; the centers of the pupils; the tip of the chin; contour points; the bases of the ears; and the like. A line drawing representing the boundaries between the plurality of polygons PG is set as the face mesh FM. It should be noted that the vertices of the plurality of polygons PG may not need to coincide with the detected feature points of the face, and may be set at any positions based on the positions of the feature points.

Subsequently, the information processing section 31 displays on the upper LCD 22 the camera image provided with the face mesh FM set in step 54 (step 55), and proceeds to the subsequent step. For example, the CPU 311 of the information processing section 31 stores, in the VRAM 313, image data of the camera image provided with the face mesh FM, the camera image represented by the camera image data Db, the face mesh FM represented by the face mesh image data Dd3. The GPU 312 of the information processing section 31 outputs to the upper LCD 22 the image drawn in the VRAM 313, and thereby displays the image on the upper LCD 22.

It should be noted that when, after a person's face has once been recognized in a camera image, the person's face is not recognized in another camera image obtained in real time, a past camera image in which the person's face has been recognized may be displayed on the upper LCD 22 within a predetermined elapsed time in the image display process of step 53. This provides an operating environment suitable for the image processing described later, for the following reason. For example, even when the person has become absent from the camera image, or even when the process of step 52 has been performed while the face recognition process on the most recent camera image has not been completed in time, once the person's face is recognized in a camera image, the camera image in which the face has been recognized is invariably displayed on the upper LCD 22.

Subsequently, with reference to the controller data Da1, the information processing section 31 determines whether or not the user has performed a predetermined operation (for example, pressing the button 14B (A button)) (step 56). When the user has not performed a predetermined operation, the information processing section 31 proceeds to step 57. On the other hand, when the user has performed a predetermined operation, the information processing section 31 proceeds to step 58.

In step 57, the information processing section 31 determines whether or not the processing is to be ended. Examples of conditions for ending the processing include that the user has performed an operation for ending the processing. When the processing is not to be ended, the information processing section 31 repeats the processing, returning to step 51. On the other hand, when the processing is to be ended, the information processing section 31 ends the processing of the flow chart.

On the other hand, when it is determined that the user has performed a predetermined operation ("Yes" in step 56), the information processing section 31 stores the current camera image and the result of the face recognition performed on the camera image, and proceeds to the subsequent step. For example, the information processing section 31 updates both the camera image data Dd1 and the camera image data De1, using the camera image represented by the camera image data Db. The information processing section 31 also updates both the face recognition result data Dd2 and the face recognition result data De2, using the face recognition result represented by the face recognition result data Dc. It should be noted that in the following descriptions, the face recognition result represented by the face recognition result data Dd2 is referred to as a "face recognition result FPU" (the result of the face recognition performed on the camera image displayed on the upper LCD 22), and the face recognition result represented by the face recognition result data De2 is referred to as a "face recognition result FPL" (the result of the face recognition performed on the camera image displayed on the lower LCD 12).

Subsequently, the information processing section 31 displays on the lower LCD 12 the camera image set in step 58, and proceeds to step 61 (FIG. 14). For example, the CPU 311 of the information processing section 31 stores in the VRAM 313 the camera image represented by the camera image data De1. The GPU 312 of the information processing section 31 outputs to the lower LCD 12 the image drawn in the VRAM 313, and thereby displays the image on the lower LCD 12.

Referring ahead to FIG. 14, in step 61, the information processing section 31 acquires operation information, and proceeds to the subsequent step. For example, the information processing section 31 acquires data indicating that the operation button 14 or the analog stick 15 has been operated, and updates the controller data Da1. Further, the information processing section 31 acquires touch coordinates representing the touch position, based on the screen coordinate system, at which the touch panel 13 is being touched, and updates the most recent touch coordinates included in the history of the touch coordinates represented by the touch position data Da2. It should be noted that when the user is not touching the touch panel 13, null values are stored in the most recent touch coordinates in the touch position data Da2.

Subsequently, with reference to the controller data Da1, the information processing section 31 determines whether or not the user has operated a predetermined controller (for example, pressing the button 14C (B button), pressing the button 14E (X button), pressing the select button 14J, or pressing the cross button 14A) (step 62). When the user has operated a predetermined controller, the information processing section 31 proceeds to step 63. On the other hand, when the user has not operated a predetermined controller, the information processing section 31 proceeds to step 64.

In step 63, the information processing section 31 performs a process corresponding to the button operation of the user, and proceeds to step 64. As a first example, when the user has pressed the button 14C (B button), the information processing section 31 initializes the hand-drawn input data De3, the hand-drawn image texture data Df, and the hand-drawn target flag data Dg1 (for example, such that neither a hand-drawn input HW nor a hand-drawn image HI are present), and deletes the hand-drawn image HI displayed on the upper LCD 22 and the hand-drawn input HW displayed on the lower LCD 12. As a second example, when the user has pressed the button 14E (X button), the information processing section 31 switches the imaging sections (the outer imaging section 23 or the inner imaging section 24) to be used, and in the subsequent processes, acquires camera images from the imaging section after the switch. As a third example, when the user has pressed the select button 14J, the information processing section 31 returns to step 51, and performs the subsequent processes (FIG. 13). As a fourth example, when the user has pressed the cross button 14A, the information processing section 31 switches the forms of input, such as the thickness, the color, and the line type of the hand-drawn line to be provided by a hand-drawn input, or the type of input mark, in accordance with the pressed directions.

In step 64, with reference to the touch position data Da2, the information processing section 31 determines whether or not the user is performing a touch operation on the touch panel 13. When the user is performing a touch operation, the information processing section 31 proceeds to step 65. On the other hand, when the user is not performing a touch operation, the information processing section 31 proceeds to step 68.

In step 65, the information processing section 31 performs a hand-drawn input process, and proceeds to the subsequent step. For example, with reference to the touch position data Da2, the information processing section 31 sets, in the display coordinate system of the lower LCD 12, a line connecting: the position on the screen of the lower LCD 12 that overlaps the touch position obtained in the previous process; and the position on the screen of the lower LCD 12 that overlaps the most recent touch position. The information processing section 31 adds the set line to the hand-drawn input HW represented by the hand-drawn input data De3, and updates the hand-drawn input data De3, using the hand-drawn input HW after the addition.

Subsequently, the information processing section 31 sets a target polygon on which a hand-drawn image is to be drawn (step 66), and proceeds to the subsequent step. For example, with reference to the polygon data Dg, the information processing section 31 extracts a polygon PG on which the hand-drawn line added in step 65 is to be mapped, sets the hand-drawn target flag of the polygon PG to on, and updates the hand-drawn target flag data Dg1. Specifically, the information processing section 31 extracts a polygon PG placed at the position, in the display coordinate system of the lower LCD 12, that overlaps the line added in step 65, and sets the hand-drawn target flag of the polygon PG to on.

Subsequently, the information processing section 31 draws on the lower LCD 12 an image corresponding to the hand-drawn input HW (step 67), and proceeds to step 68. For example, in accordance with the set forms of input (for example, the thickness, the color, and the line type of the hand-drawn line, or the type of input mark), the information processing section 31 generates, based on the display coordinate system of the lower LCD 12, a hand-drawn image corresponding to the hand-drawn input HW represented by the hand-drawn input data De3. The information processing section 31 generates a texture of the hand-drawn image so as to cover the entirety of a predetermined region including the entire hand-drawn image (the entire display region of the lower LCD 12, for example), and updates the hand-drawn image texture data Df, using the generated texture. Further, the CPU 311 of the information processing section 31 stores in the VRAM 313 the hand-drawn image corresponding to the hand-drawn image texture data Df. The GPU 312 of the information processing section 31 outputs to the lower LCD 12 the image drawn in the VRAM 313, and thereby draws the line image on the lower LCD 12. It should be noted that in the present embodiment, the texture of the hand-drawn image stored in the hand-drawn image texture data Df is also used as the texture of the hand-drawn image HI to be displayed on the upper LCD 22. When, however, the texture of the hand-drawn image HI to be displayed on the upper LCD 22 is generated separately, the information processing section 31 may generate, based on the display coordinate system of the lower LCD 12, a hand-drawn image HI corresponding to the hand-drawn input HW represented by the hand-drawn input data De3, or a hand-drawn image HI corresponding to the texture of the hand-drawn image stored in the hand-drawn image texture data Df, in the hand-drawn image drawing process performed in step 71 described later. Then, the information processing section 31 may generate a texture of the hand-drawn image HI so as to cover the entirety of a predetermined region including the entire generated hand-drawn image HI (the entire display region of the lower LCD 12, for example), and may update the hand-drawn image texture data Df, using the generated texture.

In step 68, the information processing section 31 determines whether or not, in a face recognition process performed on a newly captured camera image, a person's face has been newly recognized in the camera image. When a person's face has not been recognized in the newly captured camera image, the information processing section 31 proceeds to step 71. On the other hand, when a person's face has been recognized in the newly captured camera image, the information processing section 31 updates the face recognition result data Dc, using the face recognition result data indicating that a person's face has been recognized, and proceeds to step 69. Here, as described above, the face recognition process may be performed sequentially by the information processing section 31, using newly captured camera images, independently of the processing of the flow chart shown in FIG. 14, or may be performed by the information processing section 31 in the process of step 68 described above. In the first case, a positive determination is made in step 68 by acquiring a face recognition result indicating that a person's face has been recognized in the newly captured camera image, and the camera image data Db and the face recognition result data Dc are updated using the newly captured camera image and the result of the face recognition performed on the camera image. In the second case, on the other hand, the camera image data Db is updated using the camera image captured by the currently selected imaging section (the outer imaging section 23 or the inner imaging section 24), and a positive determination is made in step 68 when a person's face has been recognized in the camera image. Then, the face recognition result data Dc is updated using the result of the face recognition performed on the camera image.

In step 69, the information processing section 31 updates the face recognition result FPU, using the face recognition result indicating that a person's face has been newly recognized in step 68, and proceeds to the subsequent step. For example, the information processing section 31 updates the face recognition result data Dd2 (the face recognition result FPU), using the face recognition result represented by the face recognition result data Dc.

Subsequently, the information processing section 31 displays on the upper LCD 22 the camera image from which the face recognition result FPU updated in step 69 has been obtained (step 70), and proceeds to step 71. For example, the information processing section 31 updates the camera image data Dd1, using the camera image represented by the camera image data Db. The CPU 311 of the information processing section 31 stores in the VRAM 313 the camera image represented by the camera image data Dd1. The GPU 312 of the information processing section 31 outputs to the upper LCD 22 the image drawn in the VRAM 313, and thereby draws the camera image on the upper LCD 22.

In step 71, the information processing section 31 performs a process of drawing the hand-drawn image HI, and proceeds to the subsequent step. With reference to FIG. 15, a description is given below of the hand-drawn image drawing process performed in step 71.

Referring to FIG. 15, the information processing section 31 sets a temporary variable N, which is to be used in this subroutine, to 1 (step 82), and proceeds to the subsequent step.

The information processing section 31 determines whether or not a polygon N, among the plurality of polygons PG, is set as the target polygon (step 83). Here, the plurality of polygons PG are provided with unique numbers 1 to Nmax. With reference to the hand-drawn target flag data Dg1, the information processing section 31 determines whether or not the polygon N included in the plurality of polygons PG is set as the target polygon, based on whether or not the hand-drawn target flag of the polygon N is set to on. When the polygon N is set as the target polygon, the information processing section 31 proceeds to step 84. On the other hand, when the polygon N is not set as the target polygon, the information processing section 31 proceeds to step 87.

In step 84, the information processing section 31 sets the camera image coordinates corresponding to the vertices VP of the polygon N, using the face recognition result FPU, and proceeds to the subsequent step. For example, the information processing section 31 acquires the position of the person's face and the positions of the feature points of the face in the camera image, using the camera image represented by the camera image data Dd1 and the face recognition result FPU represented by the face recognition result data Dd2. Based on the acquired positions of the feature points on the camera image, the information processing section 31 sets the positions (camera image coordinates) of the vertices VP of the polygon N in the camera image, and updates the camera image coordinate data Dg3 of the polygon N, using the set positions of the vertices VP.

Subsequently, the information processing section 31 sets the texture coordinates of the vertices VP of the polygon N, using the face recognition result FPL, and proceeds to the subsequent step. For example, using the texture of the hand-drawn image represented by the hand-drawn image texture data Df and the face recognition result FPL represented by the face recognition result data De2, the information processing section 31 acquires the position of the person's face and the positions of the feature points of the face that correspond to the texture. Based on the acquired positions of the feature points corresponding to the texture, the information processing section 31 sets the positions (texture coordinates) of the vertices VP of the polygon N corresponding to the texture, and updates the texture coordinate data Dg2 of the polygon N, using the set positions of the vertices VP.

Subsequently, the information processing section 31 draws the hand-drawn image HI on the polygon N, displays the result of the drawing on the upper LCD 22 (step 86), and proceeds to step 87. For example, based on the texture coordinates of the vertices VP represented by the texture coordinate data Dg2, the information processing section 31 maps on the polygon N the texture of the hand-drawn image represented by the hand-drawn image texture data Df. Based on the camera image coordinates of the vertices VP represented by the camera image coordinate data Dg3, the information processing section 31 draws in orthogonal projection the polygon N placed at, for example, a position of Z=0 (a perspective of 0), and displays the result of the drawing on the upper LCD 22. For example, the CPU 311 of the information processing section 31 stores in the VRAM 313 the result of drawing the polygon N in orthogonal projection, together with the camera image represented by the camera image data Dd1. The GPU 312 of the information processing section 31 outputs to the upper LCD 22 the images drawn in the VRAM 313, and thereby displays the images on the upper LCD 22.

Subsequently, the information processing section 31 determines whether or not the currently set temporary variable N has reached a maximum value Nmax (that is, the number of the set polygons PG) of the numbers provided to the plurality of polygons PG (step 87). When the temporary variable N has not reached the maximum value Nmax, the information processing section 31 sets a new temporary variable N by adding 1 to the currently set temporary variable N (step 88), and repeats the process, returning to step 83 described above. On the other hand, when the temporary variable N has reached the maximum value Nmax, the information processing section 31 ends the process of the subroutine.

Referring back to FIG. 14, after performing the hand-drawn image drawing process of step 71 described above, the information processing section 31 determines whether or not the processing is to be ended. Examples of conditions for ending the processing include that the user has performed an operation for ending the processing. When the processing is not to be ended, the information processing section 31 repeats the processing, returning to step 61 described above. On the other hand, when the processing is to be ended, the information processing section 31 ends the processing of the flow chart.

Thus, based on the image processing described above, a hand-drawn input HW provided through the touch panel 13 on a hand-drawn-image-input image displayed on the lower LCD 12 is not only drawn on the hand-drawn-image-input image, but also drawn as a hand-drawn image HI on a camera image displayed on the upper LCD 22. That is, a hand-drawn image corresponding to a user input is not only reflected on a hand-drawn-image-input image used for the user input, but also reflected on another image. This enables the user to not only temporarily enjoy viewing an image on which the user themselves has provided a hand-drawn input, but also enjoy viewing another image (for example, a real-time moving image or a still image of the real world that is obtained from the real camera) on which a hand-drawn image corresponding to the hand-drawn input is reflected. Further, at the position on which the hand-drawn image corresponding to the hand-drawn input provided by the user is reflected, the hand-drawn image HI is placed based on the feature points of another image, so as to maintain the positional relationship between the feature points of the hand-drawn-image-input image and the hand-drawn input HW. This enables the user to have an operation feeling as if they have input the hand-drawn image HI on said another image. Furthermore, when said another image is a moving image, the hand-drawn image HI also moves in accordance with the movements of the feature points of said another image, while displayed. This also makes it possible to provide the user with a moving image as if the hand-drawn image HI is drawn on a real world object and moving.

Figure 16:
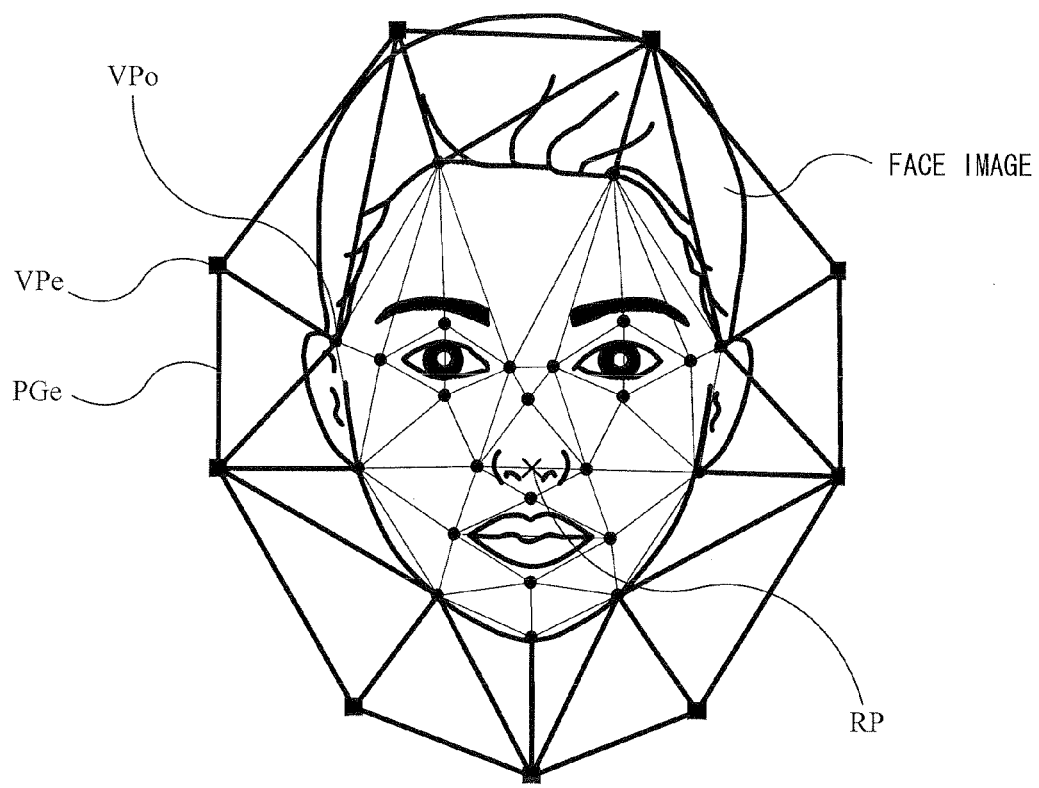
FIG. 16 is a diagram showing an example where polygons PG are provided outside the outline of a person's face image.

It should be noted that in the above descriptions, the example is where, as shown in FIGS. 11A and 11B, a plurality of polygons PG are set, on the face image representing the face recognized in the camera image, and within the outline of the face image. Polygons PG, however, may be provided also outside the outline of the face image. With reference to FIG. 16, a description is given below of an example where polygons PG are provided also outside the outline of a person's face image. It should be noted that FIG. 16 is a diagram illustrating an example where polygons PG are provided outside the outline of a person's face image.

Referring to FIG. 16, the vertices of the polygons PG provided on the outline of the face image, among the plurality of polygons PG provided within the outline, are vertices VPo. Further, a reference point RP is set based on the feature points set on the face image. The reference point RP to be set may be included in the feature points, or may not be included in the feature points. The reference point RP is set, for example, at the center of the nose, at the center of the mouth, or in the middle of both eyes, in the face image. In the example of FIG. 16, the reference point RP is set near the center of the nose in the face image.

Vertices VPe are provided outside the outline in a radial manner from the corresponding vertices VPo of the polygons PG provided on the outline. For example, the vertices VPe (the points represented by filled rectangles in FIG. 16) are set in a radial manner and at predetermined distances from the corresponding vertices VPo, using the reference point RP as the center. A triangle connecting one of the vertices VPe and the corresponding two of the vertices VPo and a triangle connecting two of the vertices VPe and the corresponding one of the vertices VPo are set outside the outline of the face image, so as to be adjacent to each other, and each triangle is set as a polygons PGe (the triangles represented by heavy solid lines in FIG. 16). The setting of the polygons PGe also outside the outline of the face image makes it possible that even when the user has provided a hand-drawn input HW outside the outline of the face image in the hand-drawn-image-input image, a hand-drawn image HI corresponding to the hand-drawn input HW outside the outline is also drawn on the camera image displayed on the upper LCD 22.

In addition, in the above descriptions, the example is where a planar image (a planar view image, as opposed to the stereoscopically visible image described above) of the real world based on a camera image acquired from either one of the outer imaging section 23 and the inner imaging section 24 is displayed on the upper LCD 22. However, an image stereoscopically visible (stereoscopic image) with the naked eye may be displayed on the upper LCD 22. For example, as described above, the game apparatus 10 is capable of displaying on the upper LCD 22 a stereoscopically visible image (stereoscopic image) using camera images acquired from the left outer imaging section 23a and the right outer imaging section 23b. In this case, the hand-drawn image HI corresponding to the hand-drawn input HW provided on the hand-drawn-image-input image displayed on the lower LCD 12 is drawn on the stereoscopic image displayed on the upper LCD 22.

For example, when the hand-drawn image HI is drawn on the stereoscopic image, the image processing described above is performed on each of a left-eye image obtained from the left outer imaging section 23a and a right-eye image obtained from the right outer imaging section 23b. Specifically, in the image processing shown in FIGS. 13 through 15, the processes performed on the camera image to be displayed on the upper LCD 22 are performed on each of the left-eye image and the right-eye image. As the hand-drawn-image-input image to be displayed on the lower LCD 12, the camera image of either one of the left-eye image and the right-eye image is used. That is, a face recognition process is performed sequentially on left-eye images, and polygons PG (hereinafter referred to as "polygons PGL", in order to be distinguished from the polygons set in the right-eye image) are set in accordance with the face recognition result. Further, a face recognition process is performed sequentially on right-eye images in a similar manner, and polygons PG (hereinafter referred to as "polygons PGR", in order to be distinguished from the polygons set in the left-eye image) are set in accordance with the face recognition result. When the hand-drawn image drawing process (step 71) is performed, the texture of the hand-drawn input HW is mapped on each of the polygons PGL and the polygons PGR, and the hand-drawn image HI is drawn on each of the polygons PGL and the polygons PGR. This causes the hand-drawn image HI to be drawn on each of the left-eye image and the right-eye image. In each image, however, the hand-drawn image HI is drawn at the position based on the feature points of the face image representing the face recognized as a person's face, and therefore, a stereoscopic image is displayed on the upper LCD 22, as if the hand-drawn image HI is drawn on the surface of the person's face displayed as a stereoscopically visible image.

Here, when an attempt is made to draw a hand-drawn image on the stereoscopically visible image at a desired position, the user may not possibly be able to specify the desired position, because of the stereoscopic effect of the stereoscopically visible image per se. In the present invention, however, when an attempt is made to draw a hand-drawn image HI on the stereoscopically visible image displayed on the upper LCD 22, the stereoscopically visible image becomes a planar image when displayed on the lower LCD 12 as the hand-drawn-image-input image. This enables the user to specify a desired position on the stereoscopically visible image displayed on the upper LCD 22, using the planar image displayed on the lower LCD 12, and therefore accurately specify the position on the stereoscopically visible image.

In addition, in the descriptions with reference to FIGS. 9 and 10 and the like, the example is where the hand-drawn image HI is generated by a line (a solid line, for example) in accordance with the touch input. The hand-drawn image HI, however, may be an image other than a line. For example, as shown in FIGS. 17A and 17B, the hand-drawn image HI may be generated such that predetermined marks (flower-like marks in the example of FIGS. 17A and 17B) are arranged along the position corresponding to the touch input. For example, in the hand-drawn input process (step 65) where the hand-drawn input HW is provided through the touch panel 13, the CPU 311 sets, in accordance with the touch position, at least one position (mark placement position) where each of the predetermined marks is placed. The hand-drawn input HW is generated by placing the predetermined marks at the set mark placement positions, respectively. As a first example, the CPU 311 sets, as a first mark placement position, the position where the user has performed a touch-on operation on the touch panel 13, and sequentially sets a new mark placement position every time the touch separates from the most recently set mark placement position by a predetermined distance during the touch input until the user subsequently performs a touch-off operation. As a second example, the CPU 311 sets, as a first mark placement position, the position where the user has performed a touch-on operation on the touch panel 13, and sequentially sets a new mark placement position every time the touch moves from the most recently set mark placement position by a predetermined distance during the touch input until the user subsequently performs a touch-off operation. As a third example, the CPU 311 sets, as a first mark placement position, the position where the user has performed a touch-on operation on the touch panel 13, and sequentially sets a new mark placement position every time a predetermined time has elapsed since the most recent mark placement position has been set, during the touch input until the user subsequently performs a touch-off operation. As is clear by comparing FIGS. 17A and 17B, when the facial expression of the face image in the camera image has changed, the positions of the vertices of the polygons PG set based on the feature points of the face also change. Consequently, the positions and the shapes of the polygons PG also change, and therefore, the mark placement positions also change in accordance with the changes in the polygons PG.

In addition, based on the same feature points extracted from the corresponding camera images, the hand-drawn image HI displayed on the upper LCD 22 is placed at the positions corresponding to the image representing the hand-drawn input HW displayed on the lower LCD 12. The hand-drawn image HI and the image representing the hand-drawn input HW, however, may be different from each other in display form. For example, as shown in FIGS. 17A and 17B, even when the hand-drawn image HI is generated such that predetermined marks are arranged, the image representing the hand-drawn input HW displayed on the lower LCD 12 may be a line (a solid line, for example) corresponding to the touch input. Further, the hand-drawn input HW may not need to be displayed as an image on the lower LCD 12. In this case, based on the same feature points extracted from the corresponding camera images, the hand-drawn image HI displayed on the upper LCD 22 is placed at the position corresponding to the touch position on the lower LCD 12. In either case, when a texture of the hand-drawn image HI is generated (step 67), the texture may be generated using an image (for example, an image in which a line drawing is placed along the touch position, or an image in which predetermined marks are arranged at the touch position) corresponding to the touch position on the lower LCD 12. This makes it possible to display various hand-drawn images HI on the upper LCD.

In addition, in the above descriptions, the example is where, when it is determined that a person's face is present in an obtained camera image, a face mesh FM is provided on the part recognized as a face, and is displayed on the upper LCD 22, together with the camera image on which the face recognition process has been performed. The face mesh FM, however, may be deleted from the upper LCD 22, for example, by an operation of the user, or after the elapse of a predetermined time. As an example, when the user has pressed the button 14B (A button) ("Yes" in step 56), the face mesh FM is deleted from the upper LCD 22. Further, the sign provided on the part recognized as a face may not need to be the face mesh FM. Here, the face mesh FM is a line drawing representing the polygons PG set based on the plurality of feature points of the face recognized in the camera image. However, a mesh line drawing unrelated to the polygons PG may cover the entire part recognized as a face. Still further, the part recognized as a face may be distinguished from other parts by providing a line representing the outline of the part, or by changing the color of the part, so as to clarify the part. Furthermore, the part recognized as a face may be distinguished from other parts by providing a predetermined sign (a arrow-shaped sign indicating the part, for example) around the part, so as to clarify the part.

In addition, in the above descriptions, a real-time moving image captured by the real camera built into the game apparatus 10 is displayed on the upper LCD 22, and a still image selected from camera images captured by the real camera is displayed on the lower LCD 12 as the hand-drawn-image-input image. In the present invention, however, the images to be displayed on the lower LCD 12 and the upper LCD 22 have various possible variations. As a first example, a real-time moving image captured by the real camera built into the game apparatus 10 is displayed on the upper LCD 22, and a still image (a still image of the real world captured by the real camera, a still image of a virtual world where a face object is placed, or the like) prepared in advance is displayed on the lower LCD 12 as the hand-drawn-image-input image. As a second example, a still image captured by the real camera built into the game apparatus 10 is displayed on the upper LCD 22, and a still image in which a person's face has been recognized is displayed on the lower LCD 12 as the hand-drawn-image-input image. In this case, the still image displayed on the lower LCD 12 may be the same as or different from the still image displayed on the upper LCD 22. As an example, when a different still image is displayed on the lower LCD 12, a still image prepared in advance is displayed on the lower LCD 12 as the hand-drawn-image-input image. As a third example, a real-time moving image captured by the real camera built into the game apparatus 10 is displayed on the upper LCD 22, and the same moving image is displayed on the lower LCD 12 as the hand-drawn-image-input image. It should be noted that the real-time moving image may be displayed on the lower LCD 12 or the upper LCD 22, so as to be delayed by a time required for the process to be performed until the camera image obtained from the real camera built into the game apparatus 10 (for example, the face recognition process performed on the camera image) is displayed. It should be noted that when a still image prepared in advance is displayed on the lower LCD 12 as the hand-drawn-image-input image, the positions of the feature points of the face included in the still image may also be prepared in advance when the still image is prepared. Thus, the prior setting of the feature points of the face in the hand-drawn-image-input image eliminates the need for the face recognition process to be performed on the image before the hand-drawn-image-input image is displayed.

In addition, a moving image or a still image displayed in the game apparatus 10 may not need to be a real world image captured by the real camera built into the game apparatus 10. For example, a moving image recorded in advance, a still image captured in advance, or a moving image or a still image obtained from television broadcasting or another device may be displayed on the upper LCD 22, and the hand-drawn image HI may be provided on the image displayed on the upper LCD 22. In this case, a still image or a moving image selected from images displayed on the upper LCD 22, or a still image prepared in advance may possibly be displayed on the lower LCD 12 as the hand-drawn-image-input image.

In addition, the game apparatus 10 that has created the hand-drawn input HW may transmit, to another game apparatus 10, data representing the hand-drawn input HW (for example, polygon data in which the texture of the hand-drawn image and the texture coordinates of the texture are set). This enables said another game apparatus 10, which is the destination game apparatus 10 that has received the data representing the hand-drawn input HW, to display the hand-drawn image HI created by the source game apparatus 10. For example, when the user of the destination game apparatus 10 or another person is captured by the real camera built into the destination game apparatus 10 and the captured camera image is displayed on the upper LCD 22, the hand-drawn image HI corresponding to the received data representing the hand-drawn input HW is provided on the person's face image included in the camera image, and the result is displayed. Accordingly, when a camera image of the real world captured by the real camera built into the destination game apparatus 10 or an image stored in advance in the destination game apparatus 10 is displayed in the destination game apparatus 10, a hand-drawn image HI created by another user is automatically provided on the displayed image. This achieves an unprecedented image viewing environment. Further, the destination game apparatus 10 is capable of additionally drawing another hand-drawn image HI by further providing a hand-drawn input HI, using the touch panel 13 in the state where the hand-drawn image HI corresponding to the received data representing the hand-drawn input HW is displayed. That is, it is also possible to display hand-drawn images HI, created by a plurality of users, together in one game apparatus 10.

In addition, in the above descriptions, a person's face is recognized in an image, and the hand-drawn image HI is placed based on the feature points of the face. The hand-drawn image HI, however, may be placed based on other feature points obtained from the image. For example, a predetermined object may be recognized in an image, and the hand-drawn image HI may be placed based on the feature points of the object. As an example, a vehicle present in an image may be recognized, and feature points may be set at the centers, the outlines, and the like of the body, the tires, the lights, and the shadow of the recognized vehicle. Then, the hand-drawn image HI may be placed based on the feature points. In this case, the hand-drawn image HI corresponding to the hand-drawn input HW provided on the vehicle displayed in the hand-drawn-image-input image is drawn on the vehicle present in the image displayed on the upper LCD 22. As another example, an indoor or outdoor information bulletin board, such as a blackboard, a whiteboard, an exhibition board, or a bulletin board, that is present in a real-time real world moving image may be recognized, and feature points may be set at the outline, the corner portions, the center, and the like of the recognized information bulletin board. Then, the hand-drawn image HI may be placed based on the feature points. In this case, the game apparatus 10 that has created the hand-drawn input HW transmits, to another game apparatus 10, data representing the hand-drawn input HW (for example, polygon data in which the texture of the hand-drawn image and the texture coordinates of the texture are set). This enables said another game apparatus 10 that has received the data representing the hand-drawn input HW to display the hand-drawn image HI. For example, the game apparatus 10 that has received the data representing the hand-drawn input HW captures the information bulletin board with the real camera built into the game apparatus 10, whereby the hand-drawn image HI corresponding to the received hand-drawn input HW is drawn on the captured information bulletin board, and the result of the drawing is displayed on the upper LCD 22. That is, information to be conveyed or the like is input through the touch panel 13 on the information bulletin board displayed on the lower LCD 12 as the hand-drawn-image-input image, and the data representing the hand-drawn input HW obtained from the input is transmitted to other game apparatuses 10, whereby the information is displayed in the other game apparatuses 10, which are the destination game apparatuses 10. In each destination game apparatus 10, the hand-drawn image HI corresponding to the received information is displayed on the information bulletin board captured in the camera image displayed on the upper LCD 22. This achieves an augmented reality where information transmitted from a source is drawn on an information bulletin board in the real world.

As a specific example of use of this, a lecturer transmits data representing writing on a board (data representing a hand-drawn input HW) from the game apparatus 10 to students. Each student captures a blackboard or a whiteboard in the lecture room with the real camera of the corresponding game apparatus 10 that has received the data. This makes it possible to acquire a camera image in which the writing on the board of the lecturer is drawn on the blackboard or the whiteboard in the lecture room. As another specific example of use, an advertiser transmits data representing an advertisement (data representing a hand-drawn input HW) from the game apparatus 10 to unspecified people. When, among the unspecified people, a user owning a game apparatus 10 that has received the data captures an indoor or outdoor information bulletin board with the real camera of the game apparatus 10, a camera image in which the transmitted advertisement is drawn on the information bulletin board is displayed on the upper LCD 22. Thus, the present invention is applicable to an advertising campaign of an advertiser.

In addition, in the above descriptions, the hand-drawn image drawing process is performed at high speed by drawing the hand-drawn image HI only on the target polygon among the plurality of polygons PG (steps 84 through 86). When, however, such an effect is not desired, the hand-drawn image HI may be drawn on all the plurality of polygons PG. In this case, the process of step 66 described with reference to FIG. 14 and the process of step 83 described with reference to FIG. 15 are unnecessary, and the hand-drawn target flag stored in the hand-drawn target flag data Dg1 is also unnecessary.

In the above embodiment, the upper LCD 22 is a parallax barrier type liquid crystal display device, and therefore is capable of switching between stereoscopic display and planar display by controlling the on/off states of the parallax barrier. In another embodiment, for example, the upper LCD 22 may be a lenticular type liquid crystal display device, and therefore may be capable of displaying a stereoscopic image and a planar image. Also in the case of the lenticular type, an image is displayed stereoscopically by dividing two images captured by the outer imaging section 23, each into vertical strips, and alternately arranging the divided vertical strips. Also in the case of the lenticular type, an image can be displayed in a planar manner by causing the user's right and left eyes to view one image captured by the inner imaging section 24. That is, even the lenticular type liquid crystal display device is capable of causing the user's left and right eyes to view the same image by dividing one image into vertical strips, and alternately arranging the divided vertical strips. This makes it possible to display an image, captured by the inner imaging section 24, as a planar image.

In addition, in the above embodiment, as an example of a liquid crystal display section including two screens, the descriptions are given of the case where the lower LCD 12 and the upper LCD 22, physically separated from each other, are arranged above and below each other (the case where the two screens correspond to upper and lower screens). The structure of a display screen including two screens, however, may be another structure. For example, the lower LCD 12 and the upper LCD 22 may be arranged on the left and right of a main surface of the lower housing 11. Alternatively, a higher-than-wide LCD that is the same in width as and twice the height of the lower LCD 12 (that is, physically one LCD having a display size of two screens in the vertical direction) may be provided on a main surface of the lower housing 11, and two images (for example, a captured image and an image representing an operation instruction screen) may be displayed on the upper and lower portions of the main surface (that is, displayed adjacent to each other without a boundary portion between the upper and lower portions. Yet alternatively, an LCD that is the same in width as and twice the width of the lower LCD 12 may be provided on a main surface of the lower housing 11, and two images may be displayed on the left and right portions of the main surface (that is, displayed adjacent to each other without a boundary portion between the left and right portions). In other words, two images may be displayed using two divided portions in what is physically a single screen. Further, when two images are displayed using two divided portions in what is physically a single screen, the touch panel 13 may be provided on the entire screen.

In addition, in the above descriptions, the touch panel 13 is integrated with the game apparatus 10. It is needless to say, however, that the present invention can also be achieved with the structure where a game apparatus and a touch panel are separated from each other. Further, the touch panel 13 may be provided on the surface of the upper LCD 22, and the display image displayed on the lower LCD 12 in the above descriptions may be displayed on the upper LCD 22.

In addition, in the above embodiment, the touch panel 13 is used as input means of the game apparatus 10 that achieves coordinate input. However, another pointing device may be used. Here, the pointing device is an input device for specifying an input position and coordinates on a screen. For example, the present invention can be similarly achieved by using a mouse, a trackpad, a trackball, a graphics tablet, or a joystick as the input means, and using position information, based on the screen coordinate system, calculated from a value output from the input means. It should be noted that in the case of a pointing device, such as a mouse, the touch state and the non-touch state may be associated with the on/off states of a click button, and coordinates may be processed as a touch position based on a value output from the mouse or the like.

In addition, in the case of a stationary game apparatus where a player enjoys a game holding a game controller, a pointing device may possibly be used in another embodiment. For example, an imaging section fixed to a housing of the game controller may be used as the pointing device. In this case, an image captured by the imaging section changes in accordance with a change in the position pointed at by the housing of the game controller. Thus, the analysis of the captured image makes it possible to calculate the coordinates of the position pointed at by the housing, so as to correspond to a display screen.

In this case, the present invention can be achieved by using the coordinates, representing the position pointed at by the housing, as a touch position in the processing described above. However, the determination of the presence or absence of an input, such as a touch-on operation or a touch-off operation, in a touch panel input is substituted by the determination of the presence or absence of, or a change in, another input from the game controller that is different from the coordinate input. As a first example, the determination of a touch-on operation or a touch-off operation is substituted by the determination of whether or not an operation button provided in the game controller is being pressed (for example, a determination is made on a touch-on operation when the A button is being pressed). As a second example, the game controller includes two housings. These two housings include a first housing including the imaging section, and a second housing to which a detection section, such as an acceleration sensor, is fixed that outputs a signal corresponding to the movement of the second housing. In this case, the determination of a touch-on operation or a touch-off operation is made in accordance with the movement of the second housing (for example, a determination is made on a touch-on operation when the second housing is tilted in a predetermined direction). As a third example, a housing of the game controller includes sound input means, such as a microphone. In this case, when a player has generated a predetermined sound, a determination is made that a touch-on operation or a touch-off operation switches to the other.

In addition, in the above embodiments, the descriptions are given using the hand-held game apparatus 10 and a stationary game apparatus. The present invention, however, may be achieved by causing an information processing apparatus, such as a general personal computer, to execute the image processing program according to the present invention. Alternatively, in another embodiment, not only a game apparatus but also any hand-held electronic device may be used, such as a personal digital assistant (PDA), a mobile phone, a personal computer, or a camera. For example, a mobile phone may include two display sections and a real camera on the main surface of a housing.

In addition, in the above descriptions, the image processing is performed by the game apparatus 10. However, at least some of the process steps in the image processing may be performed by another device. For example, when the game apparatus 10 is configured to communicate with another device (a server or another game apparatus, for example), the process steps in the image processing may be performed by the cooperation of the game apparatus 10 and said another device. As an example, a case is considered where: another device sets data (for example, polygon data in which the texture of the hand-drawn image and the texture coordinates of the texture are set) representing the hand-drawn input HW; and the game apparatus 10 performs the hand-drawn image drawing process of acquiring the data representing the hand-drawn input HW, and drawing the hand-drawn image HI. Thus, when at least some of the process steps for the image is performed by another device, it is possible to perform processing similar to the image processing described above, and also possible to apply the present invention to a process of displaying, on an image displayed on another device, the hand-drawn image HI corresponding to the created hand-drawn input HW. The image processing described above can be performed by a processor or by the cooperation of a plurality of processors, the processor and the plurality of processors included in an information processing system that includes at least one information processing apparatus. Further, in the above embodiment, the processing of the flow chart described above is performed in accordance with the execution of a predetermined program by the information processing section 31 of the game apparatus 10. However, some or all of the processing may be performed by a dedicated circuit provided in the game apparatus 10.

It should be noted that the shape of the game apparatus 10, and the shapes, the number, the arrangement, or the like of the various buttons of the operation button 14, the analog stick 15, and the touch panel 13 that are provided in the game apparatus 10 are merely illustrative, and the present invention can be achieved with other shapes, numbers, arrangements, and the like. Further, the processing orders, the setting values, the criterion values, and the like that are used in the image processing described above are also merely illustrative, and it is needless to say that the present invention can be achieved with other orders and values.

It should be noted that the image processing program (game program) described above may be supplied to the game apparatus 10 not only from an external storage medium, such as the external memory 44 or the data storage external memory 45, but also via a wireless or wired communication link. Further, the program may be stored in advance in a non-volatile storage device of the game apparatus 10. It should be noted that examples of the information storage medium having stored thereon the program may include a CD-ROM, a DVD, and any other optical disk storage medium similar to these, a flexible disk, a hard disk, a magnetic optical disk, and a magnetic tape, as well as a non-volatile memory. Furthermore, the information storage medium for storing the program may be a volatile memory that temporarily stores the program.

While the invention has been described in detail, the foregoing descriptions are in all aspects illustrative and not restrictive. It is needless to say that numerous other modifications and variations can be devised without departing from the scope of the invention. It is understood that the scope of the invention should be defined only by the appended claims. It is also understood that one skilled in the art can implement the invention in the equivalent range based on the description of the invention and common technical knowledge, from the description of the specific embodiments of the invention. Further, throughout the specification, it should be understood that terms in singular form include the concept of plurality unless otherwise specified. Thus, it should be understood that articles or adjectives indicating the singular form (for example, "a", "an", "the", and the like in English) include the concept of plurality unless otherwise specified. Furthermore, it should be understood that terms used in the present specification have meanings generally used in the art unless otherwise specified. Thus, unless otherwise defined, all the terminology and technical terms have the same meanings as those generally understood by one skilled in the art of the invention. In the event of any contradiction, the present specification (including meanings defined herein) has priority.

A storage medium having stored thereon an image processing program, an image processing apparatus, an image processing system, and an image processing method, according to the present invention can reflect an image corresponding to a user input on an image different from an image used to provide the user input, and therefore are suitable for use as an image processing program, an image processing apparatus, an image processing system, an image processing method, and the like that display various images on a display device.

What is claimed is:

1. A non-transitory computer-readable storage medium having stored thereon an image processing program executed by a computer of an image processing apparatus that displays an image on a display device, the image processing program comprising instructions configured to cause the computer to:
   acquire a first image;
   extract at least a first feature point from the first image, the first feature point being a feature point having a first feature on the first image;
   display the first image at a first location on the display device;
   display a second image at a second location on the display device, where the first and second images are displayed at different, non-overlapping, locations on the display device;
   while the first image is displayed at the first location, acquire data of a coordinate input provided on the second image displayed at the second location on the display device;
   generate input position data representing a position of the coordinate input provided on the second image using the acquired data;
   superimpose a predetermined superimposition image on the first image to create superimposed first image, the predetermined superimposition image being superimposed at a position on the first image based on the first feature point, the position on the first image corresponding to a position, represented by the input position data, on the second image based on a second feature point, the second feature point being a feature point having the first feature on the second image; and
   update the first image displayed at the first location to be the superimposed first image, the superimposed first image being concurrently displayed with the second image.

2. The non-transitory computer-readable storage medium of claim 1, wherein the instructions further the computer to:
   based on the input position data, superimpose on the second image an input image representing the coordinate input,
   wherein the second image is displayed on which the input image representing the coordinate input has been superimposed, and the position, represented by the input position data, is the position of the input image.

3. The non-transitory computer-readable storage medium of claim 2, wherein
the predetermined superimposition image is an image based on the input image.

4. The non-transitory computer-readable storage medium of claim 2, wherein the instructions are further configured to cause the computer to:
extract from the second image the input image included in a region determined based on the second feature point,
wherein the predetermined superimposition image is the extracted input image.

5. The non-transitory computer-readable storage medium of claim 4, wherein
the input image that is extracted is included in a region surrounded by three or more feature points, with each feature point having a unique feature on the second image,
three or more feature points are extracted from the first image, the three or more feature points having the unique features and corresponding to the three or more feature points on the second image, and
the extracted input image is superimposed on the first image in a region surrounded by the extracted three or more feature points.

6. The non-transitory computer-readable storage medium of claim 2, wherein the instructions are further configured to cause the computer to:
generate a texture representing the input image superimposed on the second image;
set texture coordinates of a polygon corresponding to the generated texture based on the second feature point on the second image;
map the generated texture on the polygon; and
place the polygon on the first image based on the first feature point on the first image.

7. The non-transitory computer-readable storage medium of claim 2, wherein the instructions are further configured to cause the computer to:
acquire the second image;
extract a first plurality of feature points from an image representing an object recognized in a process of recognizing a predetermined object performed on the acquired second image, each feature point having a unique feature on the first image representing the object;
extract a first plurality of out-of-region points provided outside the image representing the object, in a radial manner from the corresponding feature points;
extract a second plurality of feature points from an image representing an object recognized in a process of recognizing the predetermined object performed on the acquired first image, the second plurality of feature points having the unique features and corresponding to the extracted first plurality of feature points;
extract a second plurality of out-of-region points provided outside the image representing the object, in a radial manner, so as to correspond to the extracted first plurality of out-of-region points; and
extract from the second image the input image included in a region surrounded by three or more of the first plurality of feature points and/or the first plurality of out-of-region points,
wherein the predetermined superimposition image is superimposed on the first image, in a region surrounded by three or more of the second plurality of feature points and/or the second plurality of out-of-region points corresponding to the region from which the input image has been extracted, the superimposition image being the extracted input image.

8. The non-transitory computer-readable storage medium of claim 1, wherein the instructions further cause the computer to:
acquire the second image; and
extract the second feature point having the first feature from the acquired second image.

9. The non-transitory computer-readable storage medium of claim 8, wherein
the first image and the second image are each an image including a face image representing a person's face,
the second feature point is extracted from the face image of a person's face recognized in a face recognition process performed on the acquired second image, the second feature point being a point having the first feature in accordance with the face image, and
the first feature point is extracted from the face image of a person's face recognized in a face recognition process performed on the acquired first image, the first feature point being a point having the first feature in accordance with the face image.

10. The non-transitory computer-readable storage medium of claim 1, wherein
the first image is a moving image,
the first feature point is extracted from a frame image included in the moving image, and
the predetermined superimposition image is superimposed on the frame image included in the moving image.

11. The non-transitory computer-readable storage medium of claim 10, wherein
the first feature point is extracted from each of a plurality of frame images included in the acquired moving image, and
the predetermined superimposition image is superimposed on each of the plurality of frame images included in the moving image.

12. The non-transitory computer-readable storage medium of claim 11, wherein the instructions are further configured to cause the computer to:
sequentially update the input position data every time coordinate input is acquired, and
the predetermined superimposition image is superimposed on the corresponding frame image, at a position on the corresponding frame image based on the first feature point, the position on the first image corresponding to a position represented by the most recently updated input position data.

13. The non-transitory computer-readable storage medium of claim 10, wherein the instructions are further configured to cause the computer to:
store in a storage device the frame image included in the acquired moving image, wherein,
when the first feature point is extracted from the frame image, the frame image is read from the storage device from which the extraction has been made.

14. The non-transitory computer-readable storage medium of claim 10, wherein
the first image is a moving image of a real world captured in real time by a real camera available to the image processing apparatus.

15. The non-transitory computer-readable storage medium of claim 1, wherein
the second image is a still image displayed on the display device.

16. The non-transitory computer-readable storage medium of claim 1, wherein the instructions are further configured to cause the computer to:

extract at least a third feature point from the acquired first image, the third feature point being a feature point having a second feature on the first image, wherein the predetermined superimposition image is superimposed on the first image at a position on the first image that is based on the first feature point and the third feature point, the position on the first image corresponding to a position, represented by the input position data, on the second image that is based on the second feature point and a fourth feature point, the fourth feature point being a feature point having the second feature on the second image.

17. The non-transitory computer-readable storage medium of claim 16, wherein the superimposed predetermined superimposition image is set to a size in accordance with a relationship between (1) distance between the second feature point and the fourth feature point on the second image and (2) a distance between the first feature point and the third feature point on the first image.

18. The non-transitory computer-readable storage medium of claim 16, wherein the instructions are further configured to cause the computer to:

determine a position and an orientation of the superimposition image to be superimposed on the first image, such that a relative positional relationship between (1) the first feature point and the third feature point on the first image and (2) the superimposition image, is the same as a relative positional relationship between (1) the second feature point and the fourth feature point on the second image and (2) the position represented by the input position data.

19. The non-transitory computer-readable storage medium of claim 1, wherein the first image and the second image are each an image including a face image representing a person's face, the first feature point is extracted from the face image of a person's face recognized in a face recognition process performed on the acquired first image, the first feature point being a point having the first feature in accordance with the face image, and the superimposition image is superimposed on the first image such that the second feature point is a point having the first feature in accordance with the face image included in the second image.

20. The non-transitory computer-readable storage medium of claim 1, wherein the display device includes at least a first display screen and a second display screen, the second image is displayed on the second display screen, and the first image on which the superimposition has been made is displayed on the first display screen.

21. The non-transitory computer-readable storage medium of claim 20, wherein the display device includes a touch panel that covers the second display screen, the data of the coordinate input represents a touch position of a touch performed on the touch panel, and the input position data is generated to represent a position on the second image that overlaps the touch position.

22. The non-transitory computer-readable storage medium of claim 21, wherein the first display screen is capable of displaying a stereoscopically visible image, using a left-eye image and a right-eye image, the first image is a stereoscopically visible image including a left-eye image and a right-eye image, the first feature point is extracted from each of the left-eye image and the right-eye image of the first image, the superimposition image is superimposed on the first image, at a position of the left-eye image and a position of the right-eye image on the first image based on the first feature point, each position corresponding to the position, represented by the input position data, on the second image based on the second feature point, and the stereoscopically visible image is displayed on the first display screen, using the left-eye image and the right-eye image of the first image on which the superimposition has been made.

23. The non-transitory computer-readable storage medium of claim 1, wherein drawing input that corresponds to the data of the coordinate input provided on the second input temporally corresponds to display of corresponding image information used in the predetermined superimposition image that is superimposed on the simultaneously displayed first image.

24. The non-transitory computer-readable storage medium of claim 1, wherein the first and second images are different images.

25. An image processing apparatus that displays an image on a display device, the image processing apparatus comprising:

a processing system that includes at least one processor, the processing system configured to:

accept a first image;

extract at least a first feature point from the first image, the first feature point being a feature point having a first feature on the first image;

output a second image to the display device for display at a first location;

acquire data of a coordinate input provided on the display device and within the first location where the second image is displayed;

generate input position data representing a position of the coordinate input provided on the second image, using the acquired data;

superimpose a predetermined superimposition image on the first image, at a position on the first image based on the first feature point, the position corresponding to a position, represented by the input position data, on the second image based on a second feature point, the second feature point being a feature point having the first feature on the second image; and output the first image, on which the predetermined superimposition image has been superimposed, to the display device for display at a second location that is non-overlapping and different from the first location where the second image is displayed, the first and second images being output for concurrent display on the display device, where the first image is updated to include the predetermined superimposition image as the coordinate input is provided that the displayed first image is based upon.

26. An image processing system that includes a plurality of apparatuses configured to communicate with each other and displays an image on a display device, the image processing system comprising:

first image acquisition unit configured to acquire a first image;

first feature point extraction unit configured to extract at least a first feature point from the first image, the first feature point being a feature point having a first feature on the first image;

second image display control unit configured to display a second image on the display device;

coordinate input acquisition unit configured to acquire data of a coordinate input provided on the second image displayed on the display device;

input position data generation unit configured generate input position data representing a position of the coordinate input provided on the second image, using the data acquired by the coordinate input acquisition unit;

first image superimposition unit configured to superimpose a predetermined superimposition image on the first image, at a position on the first image based on the first feature point, the position corresponding to a position, represented by the input position data, on the second image based on a second feature point, the second feature point being a feature point having the first feature on the second image; and first image display control unit configured to display on the display device the first image on which the superimposition has been made by the first image superimposition unit, wherein the first image, which has been superimposed with the predetermined superimposition image, and the second image are concurrently displayed on the display device at different, non-overlapping, locations thereon such that the first image is displayed while the coordinate input is provided.

27. The image processing system according to claim 26, wherein at least a first apparatus and a second apparatus are configured to communicate with each other, the first apparatus includes:
the second image display control unit;
the coordinate input acquisition unit;
the input position data generation unit;
a second image superimposition unit configured to, based on the input position data, superimpose on the second image an input image representing the coordinate input; and
a first transceiver configured to transmit data of the input image to the second apparatus, wherein
the second image display control unit is further configured to display, on a display device available to the first apparatus, the second image on which the superimposition has been made by the second image superimposition unit, and the second apparatus includes:
a second transceiver configured to receive the data of the input image from the first apparatus;
the first image acquisition unit;
the first feature point extraction unit;
the first image superimposition unit; and
the first image display control unit, wherein based on the data of the input image received by the second transceiver, the first image superimposition unit is further configured to superimpose the superimposition image on the first image, at the position on the first image based on the first feature point, the position corresponding to a position of the input image on the second image based on the second feature point, the superimposition image being an image based on the input image, and the first image display control unit is further configured to display, on a display device available to the second apparatus, the first image on which the superimposition has been made by the first image superimposition unit.

28. An image processing method performed by a processor or by plurality of processors in cooperation, the processor and/or the plurality of processors included in an image processing system that includes at least one information processing apparatus capable of performing image processing for displaying an image on a display device, the image processing method comprising:

acquiring a first image;

extracting at least a first feature point from the first image, the first feature point being a feature point having a first feature on the first image;

displaying the first image at a first location on the display device;

displaying a second image at a second location on the display device such that the first and second images are displayed at different, non-overlapping, locations on the display device;

while the first image is being displayed at the first location, acquiring data of a coordinate input provided on the second image displayed at the second location;

generating input position data representing a position of the coordinate input provided on the second image, using the acquired data;

responsive to the generation of the input position data, superimposing a predetermined superimposition image on the first image to generate a superimposed first image, the predetermined superimposition image being superimposed at a position on the first image based on the first feature point, the position corresponding to a position, represented by the input position data, on the second image based on a second feature point, the second feature point being a feature point having the first feature on the second image; and updating the first image displayed at the first location to be the generated superimposed first image at the first location, the updated first image being concurrently displayed with the second image.

* * * * *